(12) United States Patent
Shiraki et al.

(10) Patent No.: US 7,394,603 B2
(45) Date of Patent: Jul. 1, 2008

(54) LENS DRIVING APPARATUS

(75) Inventors: Manabu Shiraki, Yamato (JP); Satoshi Asakawa, Yamato (JP); Naoki Sekiguchi, Yamato (JP); Morimasa Yoshie, Yamato (JP)

(73) Assignee: Shicoh Engineering Co., Ltd., Kanagawa (JP)

( * ) Notice: Subject to any disclaimer, the term of this patent is extended or adjusted under 35 U.S.C. 154(b) by 658 days.

(21) Appl. No.: 10/926,221

(22) Filed: Aug. 26, 2004

(65) Prior Publication Data

US 2005/0180275 A1  Aug. 18, 2005

(30) Foreign Application Priority Data

| Feb. 18, 2004 | (JP) | ................................ 2004-41133 |
| Feb. 18, 2004 | (JP) | ................................ 2004-41323 |
| Feb. 23, 2004 | (JP) | ................................ 2004-45572 |
| Feb. 27, 2004 | (JP) | ................................ 2004-53405 |
| Mar. 4, 2004 | (JP) | ................................ 2004-60034 |
| Mar. 4, 2004 | (JP) | ................................ 2004-60126 |

(51) Int. Cl.
*G02B 7/02* (2006.01)
*G02B 15/14* (2006.01)

(52) U.S. Cl. ......................... 359/819; 359/694; 359/823

(58) Field of Classification Search ......... 359/819–823, 359/694–700
See application file for complete search history.

(56) References Cited

U.S. PATENT DOCUMENTS

| 4,785,210 | A | * | 11/1988 | Maruyama et al. ............. 310/12 |
| 2001/0028516 | A1 | * | 10/2001 | Noguchi ..................... 359/823 |
| 2005/0174657 | A1 | * | 8/2005 | Honsho ..................... 359/819 |

* cited by examiner

*Primary Examiner*—Mohammed Hasan
(74) *Attorney, Agent, or Firm*—Wenderoth, Lind & Ponack, L.L.P.

(57) ABSTRACT

A lens driving apparatus includes: a first yoke having an inner peripheral wall and an outer peripheral wall placed to be concentric with each other and forming a rectangular U-shape cross section and a cylindrical shape; a second yoke placed at an outer side of the first yoke to be concentric with the first yoke and forming a rectangular U-shape cross section and a cylindrical shape; a base; a first magnet and a first coil arranged in a rectangular U-shape interior of the first yoke; a second magnet and a second coil arranged in a rectangular U-shape interior of the second yoke; a first lens support member; and a second lens support member. The second lens support member is placed at an inner peripheral side of the second yoke and has the second coil fixed onto an outer periphery thereof. The first lens support member is linearly moved in a direction of an optical axis of a lens by an electromagnetic force caused by passing current through the first coil. The second lens support member is linearly moved in a direction of an optical axis of a lens by an electromagnetic force caused by passing current through the second coil.

15 Claims, 22 Drawing Sheets

FIG.28A
FIG.28B
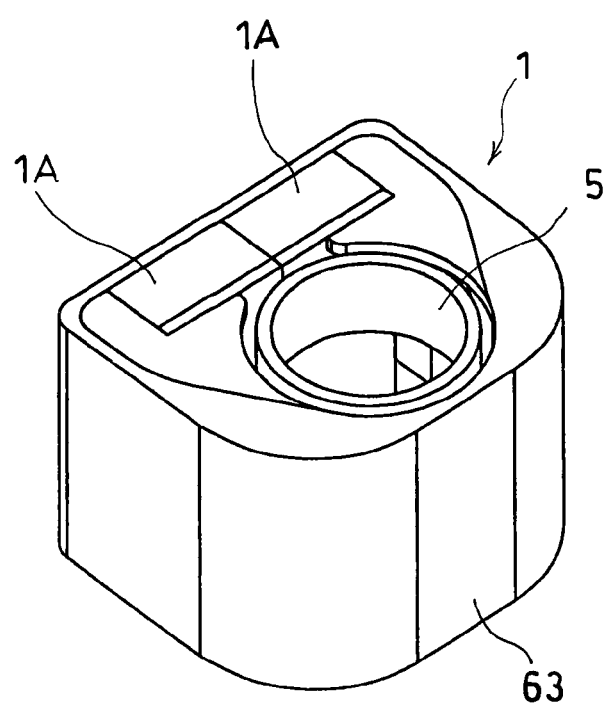
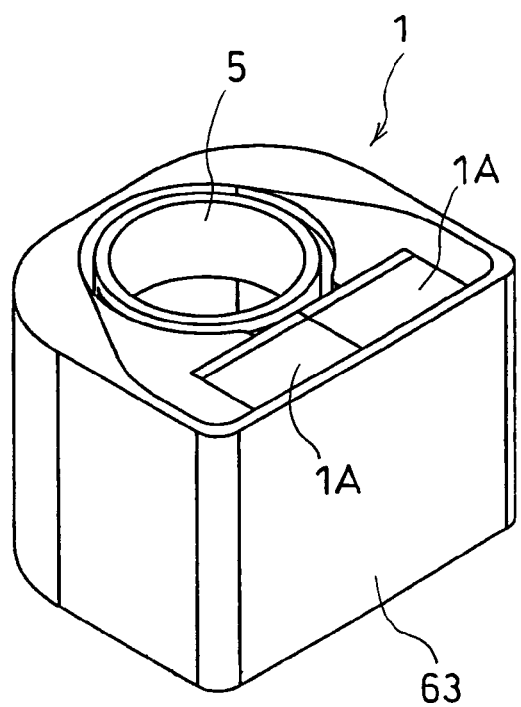

LENS DRIVING APPARATUS

BACKGROUND OF THE INVENTION

1. Field of the Invention

The present invention relates to a lens driving apparatus that drives a zoom lens and an autofocus lens, which are used in a small-sized portable camera built into a digital camera, a cellular phone and the like.

2. Description of the Related Art

Conventionally, such a lens driving apparatus that performs both autofocusing and scaling with a zoom lens and a focus lens is known as disclosed in, for example, Unexamined Japanese Patent Publication Hei 7-140523. The lens driving apparatus in this conventional art converts a rotational movement using a ball screw and the like to a linear movement to move the lens in a direction of an optical axis.

By the way, in the lens driving apparatus, which is used in a small-sized portable camera, it is required that a lens be efficiently moved in a direction of an optical axis by a desired amount in a narrow space.

However, when structure in which rotational movement using the ball screw and the like is converted to linear movement to move the lens in the direction of the optical axis is used in the small-sized portable camera, drive loss is increased since a direction of thrust and a moving direction of the lens are not the same. Accordingly, there is a possibility that a moving speed of the lens will be decreased and responsivity will become slow.

SUMMARY OF THE INVENTION

In view of the above problems in the conventional art, an object of the present invention is to provide a lens driving apparatus having a small amount of drive loss, excellent responsivity and mobility and being suitable for mounting on a small-sized camera.

In a first aspect of the present invention, a lens driving apparatus includes a first yoke having an inner peripheral wall and an outer peripheral wall placed to be concentric with each other and forming a rectangular U-shape cross section and a cylindrical shape at a connecting portion between the inner peripheral wall and the outer peripheral wall. The lens driving apparatus further includes a second yoke placed at an outer side of the first yoke to be concentric with the first yoke and forming a rectangular U-shape cross section and a cylindrical shape. The lens driving apparatus further includes a base to which the first and second yokes are attached. The lens driving apparatus further includes a first magnet and a first coil arranged in a rectangular U-shape interior of the first yoke. The lens driving apparatus further includes a second magnet and a second coil arranged in a rectangular U-shape interior of the second yoke. The lens driving apparatus further includes a first lens support member placed at an inner peripheral side of the first yoke and having the first coil fixed onto an outer periphery thereof. The lens driving apparatus further includes a second lens support member placed at an inner peripheral side of the second yoke and having the second coil fixed onto an outer periphery thereof. The first lens support member is linearly moved in a direction of an optical axis of a lens by an electromagnetic force caused by passing current through the first coil. The second lens support member is linearly moved in a direction of the optical axis of the lens by an electromagnetic force caused by passing current through the second coil.

According to the first aspect of the present invention, since the first and second lens support members are linearly moved in the direction of the optical axis of the lens by the electromagnetic force caused by passing current through the coil, a direction of thrust matches a moving direction of the lens support members. Accordingly, unlike the conventional art, there is no need of using a gear, so that an amount of drive loss is extremely small. This makes it possible to accelerate a moving speed of the lens and improve responsivity. Namely, since the amount of drive loss is small and responsivity and mobility are excellent, the lens can be efficiently moved in the direction of the optical axis by a desired amount in a narrow space and this is excellent in terms of mounting on a small-sized camera.

Since the first yoke and the second yoke are arranged to be concentric with each other (the same can be applied to the magnet and the coil contained in the yoke), the lens driving apparatus in its entirety can be miniaturized.

Moreover, the lens support members are moved by an electromagnetic force. Unlike the conventional art, the lens support members are not engaged with a gear and a cam groove to make it possible to prevent rattle due to accuracy error of these components. Also, since a gear and cam are not provided, miniaturization can be improved.

In a second aspect of the present invention, a lens driving apparatus includes a yoke having an inner peripheral wall and an outer peripheral wall placed to be concentric with each other and forming a rectangular U-shape cross section and a cylindrical shape at a connecting portion between the inner peripheral wall and the outer peripheral wall. The lens driving apparatus further includes a base to which the yoke is attached. The lens driving apparatus further includes a magnet placed between the inner peripheral wall of the yoke and the outer peripheral wall. The lens driving apparatus further includes a first lens support member having a first coil on an outer periphery thereof to be placed at an inner peripheral side of the magnet. The lens driving apparatus further includes a second lens support member having a second coil on an outer periphery thereof to be placed at an inner peripheral side of the first coil. The first lens support member is linearly moved in a direction of an optical axis of a lens by an electromagnetic force caused by passing current through the first coil. The second lens support member is linearly moved in a direction of the optical axis of the lens by an electromagnetic force caused by passing current through the second coil.

According to the second aspect of the present invention, similar to the first aspect of the present invention, since the first and second lens support members are linearly moved in the direction of the optical axis of the lens by an electromagnetic force caused by passing current through a corresponding coil, a direction of thrust matches a moving direction of the lens support members (lens). Accordingly, an amount of drive loss is extremely small. This makes it possible to accelerate a moving speed of the lens and improve responsivity. Namely, since the amount of drive loss is small and responsivity and mobility are excellent, the lens can be efficiently moved in the direction of the optical axis by a desired amount in a narrow space and this is excellent in terms of mounting on a small-sized camera. Moreover, the lens support members are moved by an electromagnetic force. Unlike the conventional art, the lens support members are not engaged with a gear and a cam groove to make it possible to prevent rattle due to accuracy error of these components. Also, since a gear and the cam are not provided, miniaturization can be improved.

Furthermore, in the second aspect of the present invention, one yoke and one magnet are shared in the first and second lens support members and the first and second coils added thereto. Accordingly, as compared with a case in which a yoke and a magnet are provided for each support member, an outer diameter of the lens driving apparatus in its entirety can be reduced to make it possible to miniaturize the lens driving apparatus.

The first lens support member and the second lens support member are positioned to be spaced from each other along the direction of the optical axis. For this reason, for example, when a zoom lens and a focus lens are supported by the first lens support member and the second lens support member, a compact apparatus that has both an autofocus mechanism and a scaling function can be efficiently achieved.

In a third aspect of the present invention, a lens driving apparatus includes a yoke having an inner peripheral wall and an outer peripheral wall placed to be concentric with each other and forming a rectangular U-shape cross section and a cylindrical shape at a connecting portion between the inner peripheral wall and the outer peripheral wall. The lens driving apparatus further includes a base to which the yoke is attached. The lens driving apparatus further includes a magnet placed between the inner peripheral wall of the yoke and the outer peripheral wall. The lens driving apparatus further includes a first lens support member having a first coil to be placed at an inner periphery of the magnet in the yoke and faces the magnet. The lens driving apparatus further includes a second lens support member having a second coil to be placed at the inner periphery of the magnet in the yoke and faces the magnet. The first coil and the second coil are arranged in parallel in a direction of an optical axis of a lens. A space distance of the first coil from the magnet is substantially equal to a space distance of the second coil from the magnet. The first and second lens support members are linearly moved in the direction of the optical axis of the lens by an electromagnetic force caused by passing current through the coil.

According to the third aspect of the present invention, similar to the first and second aspects of the present invention, since the first and second lens support members are linearly moved in the direction of the optical axis of the lens by the electromagnetic force caused by passing current through the coil, an amount of drive loss is extremely small to make it possible to accelerate a moving speed of the lens and improve responsivity.

Furthermore, similar to the second aspect of the present invention, one yoke and one magnet are shared in the first and second lens support members, and the first and second coils are added thereto. Accordingly, as compared with a case in which the yoke and the magnet are provided for each support member, an outer diameter of the lens driving apparatus in its entirety can be reduced to make it possible to miniaturize the lens driving apparatus.

Moreover, since a distance between the magnet and the first coil is set to be substantially equal to a distance between the magnet and the second coil, a magnetic force equally acts on the first and second coils of the first and second support members. For this reason, no variation occurs in moving speed of the first and second lens support members in the direction of the optical axis. Also, both the first and second coils can be arranged to be close to the magnet, thereby making it possible to cause a strong magnetic force to act on the first and second coils and improve thrust.

In the first to third aspects of the present invention, the first lens support member preferably comes into slidable contact with the first yoke and the second lens support member comes into slidable contact with the second yoke. The first lens support member and the second lens support member come into contact with the first yoke or second yoke by friction, thereby making it possible to sufficiently satisfy a demand for excellent maintenance and mobility of the lens support members, delicate movement of the focus lens, and fixed magnification of the zoom lens.

In the first to third aspects of the present invention, the first and second lens support members are preferably held to the yoke or base by a spring. The spring urges each lens support member to the base in a state that no current is passed through the coil. Accordingly, maintenance of the lens support members to the yokes can be sufficiently secured. Also, in a case where, for example, shaking and impact occur at a time of carrying the camera, shaking and rattle are less likely to be generated in the lens support members to provide excellent impact resistance.

In a fourth aspect of the present invention, a lens driving apparatus includes a cylindrical yoke. The lens driving apparatus further includes a pair of cylindrical lens support members contained in the yoke to be concentric with each other and movable along an axial direction of the yoke. The lens driving apparatus further includes a magnet fixed to one of the pair of lens support members and the yoke. The lens driving apparatus further includes a coil member fixed to the other of the pair of lens support members and the yoke. The lens driving apparatus further includes a magnetic member that generates magnetic attraction between the magnet and the magnetic member. Movement of these respective lens support members in a direction of an optical axis is suppressed by a magnetic urging force on always receiving a magnetic urging force acting between the magnet and the magnetic member. The lens support members are linearly moved by an electromagnetic force induced by a magnetic field formed by current flowing into a coil of the coil member and the magnet.

According to the fourth aspect of the present invention, similar to the first to third aspects of the present invention, since the lens is linearly moved in the direction of the optical axis by an electromagnetic force caused by passing current through the coil, a direction of thrust matches a moving direction of the lens. Accordingly, an amount of drive loss may be extremely small. This makes it possible to accelerate a moving speed of the lens and improve responsivity. Namely, since the amount of drive loss is small and responsivity and mobility are excellent, the lens can be efficiently moved in a direction of an optical axis by a desired amount in a narrow space, and this is excellent in terms of mounting on a small-sized camera.

The pair of cylindrical lens support members is concentrically contained in the cylindrical yoke. Moreover, the cylindrical magnet and an arc coil (an arc magnet and the cylindrical coil), which move lens support members, are built in the yoke. Accordingly, this makes it possible to miniaturize the lens driving apparatus.

Moreover, the lens support members are linearly moved by an electromagnetic force induced by a magnetic filed formed by the current flowing into the coil and the magnet as always receiving magnetic attraction acting between the magnet and the magnetic members. In this way, when the attraction always acts on the lens support members, the lens support members can be prevented from being shifted by impact. Also, movement of the lens support members can be stabilized, so that the lens support members can be correctly moved by a desired amount. In other words, maintenance of the lens support members can be sufficiently secured and even when shaking and impact occur, shaking and rattle are less likely to be generated in the lens support members to provide excellent impact resistance. This makes it possible to sufficiently satisfy a demand for delicate movement of the focus lens, and fixed magnification of the zoom lens. Furthermore, for example, when the lens support members are positioned to be spaced from each other along a direction of the optical axis and the zoom lens and the focus lens are supported by the respective lens support members, a compact apparatus that has both an autofocus mechanism and a scaling function can be efficiently achieved.

In the fourth aspect of the present invention, the magnet preferably includes two magnet portions arranged along a moving direction of the lens support members. Also, polarities of two adjacent magnet portions are preferably different from each other. In this case, an urging force is caused to act on the lens support members in directions opposite to each other, so that no bias force works on the yoke, which supports the lens support members.

In the fourth aspect of the present invention, the lens driving apparatus may further include guide shafts that guide movement of the lens support members. Each guide shaft has a circular cross section and each lens support member has an abutting surface abutted against the guide shaft by a magnetic urging force, and this abutting surface is wedge-shaped.

The guide shaft preferably abuts the abutting surface of the lens support member when the magnet and the coil receive the magnetic urging force, and provides a frictional force when the lens support member is moved.

In this case, cross sections of the guide shafts are circular-shaped and abutted surfaces of the lens support members, which are abutted against the guide shafts by magnetic attraction, are wedge-shaped. Accordingly, the lens support members come into contact with the shafts with a fixed pressure to make it possible to stably and smoothly move the lens support members along the guide shafts.

In a fifth aspect of the present invention, a lens driving apparatus includes a cylindrical yoke. The lens driving apparatus further includes three first, second, and third annular magnets that are arranged in the yoke to be concentric with one another and spaced from one another along an axial direction of the yoke. The lens driving apparatus further includes a first lens support member having a first coil that is provided at an outer periphery thereof to be movably placed between the first magnet and the second magnet. The lens driving apparatus further includes a second lens support member having a second coil that is provided at an outer periphery thereof to be movably placed between the second magnet and the third magnet. The first lens support member is linearly moved by an electromagnetic force induced by current flowing into the first coil and a magnetic field formed by the first magnet and the second magnet. The second lens support member is linearly moved by an electromagnetic force induced by current flowing into the second coil and a magnetic field formed by the second magnet and the third magnet.

According to the fifth aspect of the present invention, similar to the first to fourth aspects of the present invention, since the lens is linearly moved in the direction of the optical axis by an electromagnetic force caused by passing current through a coil, a direction of thrust matches a moving direction of the lens. Accordingly, an amount of drive loss may be extremely small. This makes it possible to increase a moving speed of the lens and improve responsivity. Namely, since the amount of drive loss is small and responsivity and mobility are excellent, the lens can be efficiently moved in the direction of the optical axis by a desired amount in a narrow space and this is excellent in terms of mounting on a small-sized camera. Also, the lens support members are positioned to be spaced from each other along the direction of the optical axis. Accordingly, when a zoom lens and a focus lens are supported by respective lens support members, a compact apparatus that has both an autofocus mechanism and a scaling function can be efficiently achieved.

Furthermore, two magnetic field spaces are formed to be adjacent each other axially in the cylindrical yokes by the three annular magnets which are arranged to be concentric with one another. Also, two cylindrical lens support members are made to correspond to these magnetic field spaces and be moved individually. This makes it possible to achieve linear movement of the lenses with an extremely compact structure. Moreover, an interior of the yokes is divided in an axial direction to individually form the magnetic field spaces where respective lens support members are moved. For this reason, even when both of the lens support members are moved at the same time, influence on the coils caused by a magnetic repulsion and the like can be suppressed to a minimum. In other words, for example, when two lens support members are moved in a common magnetic field space, there occurs trouble in movement of the two lens support members by magnetic interaction between the coils. However, when a magnetic field space where respective lens support members are moved is individually divided, such trouble can be suppressed to a minimum.

In the fifth aspect of the present invention, the three first, second and third magnets are preferably spaced from one another with an equal distance.

When three magnets are axially spaced from one another with an equal distance, attenuation of an electromagnetic force accompanied by movement of lens support members can be suppressed to a minimum. In other words, when two lens support members are moved in one magnetic field space formed by the first magnet and the third magnet without placing the second magnet between the first magnet and the third magnet, the greater the space distance from the magnets becomes, the smaller an amount of electromagnetic force becomes, thereby making it difficult to control movement accurately. However, when the second magnet is placed with an equal distance between the first magnet and the third magnet (at a center between the first magnet and the third magnet), attenuation of an electromagnetic force accompanied by movement of the lens support members can be suppressed to a minimum to control movement easily.

In the fifth aspect of the present invention, the lens driving apparatus may further include a guide member that guides linear movement of the lens support members. The guide member is preferably shared in two lens support members and includes at least one shaft that passes through these lens support members in an axial direction. Linear movement of the lens support members can be guided and the lens support members can be stably moved. Moreover, the shaft is shared in respective lens support members. Accordingly, as compared with a case in which a shaft is provided for each lens support member, the lens driving apparatus in its entirety can be made compact.

In a sixth aspect of the present invention, a lens driving apparatus includes a yoke that forms a box-shape containing space. The lens driving apparatus further includes a magnet placed in the containing space. The lens driving apparatus further includes a coil placed in the containing space. The lens driving apparatus further includes a magnetic member that forms magnetic attraction between the magnet and the magnetic member. The lens driving apparatus further includes a lens support member to which the magnet or the yoke is fixed to support a lens. The lens driving apparatus further includes a guide member that guides linear movement of the coil or magnet and includes a guide rail fixed to the yoke and a slide member that holds the coil to slidably engage with the guide rail. The lens, which is linearly moved by an electromagnetic force induced by current flowing into the coil and a magnetic field formed by the magnet, is moved along a direction of an optical axis as always receiving magnetic attraction acting between the magnet and the magnetic member.

According to the sixth aspect of the present invention, similar to the first to fifth aspects of the present invention, since the lens is linearly moved in the direction of the optical axis by an electromagnetic force caused by passing current through a coil, a direction of thrust matches a moving direction of the lens. Accordingly, an amount of drive loss may be extremely small. This makes it possible to increase a moving speed of the lens and improve responsivity. Namely, since the amount of drive loss is small and responsivity and mobility are excellent, the lens can be efficiently moved in the direction of the optical axis by a desired amount in a narrow space and this is excellent in terms of mounting on a small-sized camera. The lens support members can be smoothly and stably moved by the guide rails and the slide member.

Since the magnet or yoke, which generates an electromagnetic force, is fixed to the lens driving members driven on receiving an electromagnetic force, miniaturization of the lens driving apparatus in its entirety can be improved.

The magnet preferably includes a plurality of magnets arranged in series along a direction where a driving member is moved, and polarities of magnets adjacent in an arranging direction are preferably different from each other. In this case, the magnet includes multiple magnet portions arranged in series along a moving direction of the lens support members and polarities of the magnet portions adjacent each other in a direction of arrangement are different from each other. This makes it possible to generate an electromagnetic force (thrust) in the same direction over an entire length of a passage where the lens support members are moved and achieve satisfactory linear movement.

The lens driving apparatus may further include a housing having lens support members to be held in a state that the lens support members are opposite to each other. The lens support members are preferably positioned to be spaced from each other along the direction of the optical axis. In this case, the lens support members are positioned to be spaced from each other along the direction of the optical axis. For this reason, when a zoom lens and a focus lens are supported by each lens support member, a compact apparatus that has both an autofocus mechanism and a scaling function can be efficiently achieved.

BRIEF DESCRIPTION OF THE DRAWINGS

These objects and other objects and advantages of the present invention will become more apparent upon reading of the following detailed description and the accompanying drawings in which:

FIG. 28A is a view of an assembled body of the lens driving apparatus of FIG. 27 seen from the top, and FIG. 28B is a view of the assembled body of the lens driving apparatus of FIG. 27 seen from the bottom.

DETAILED DESCRIPTION OF THE PREFERRED EMBODIMENTS

Embodiments of the present invention will be explained with reference to the accompanying drawings.

First Embodiment

Figure 1:
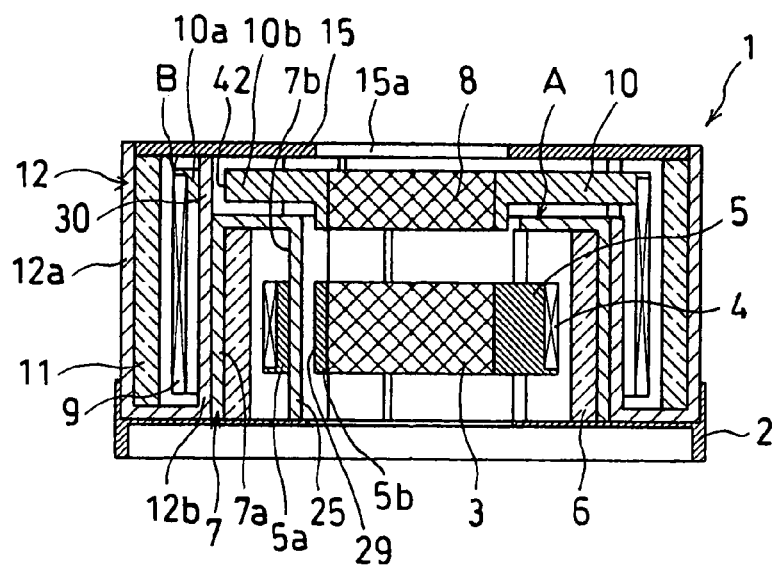
FIG. 1 is a sectional view of a lens driving apparatus according to a first embodiment of the present invention.
Figure 2A:
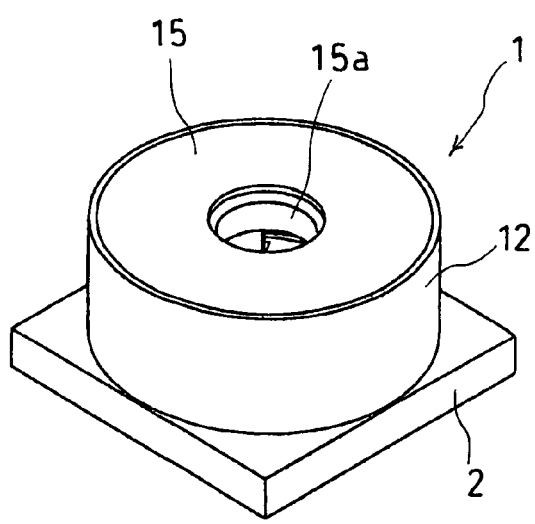
FIG. 2A is a perspective view of the lens driving apparatus of FIG. 1 seen from the top.
Figure 2B:
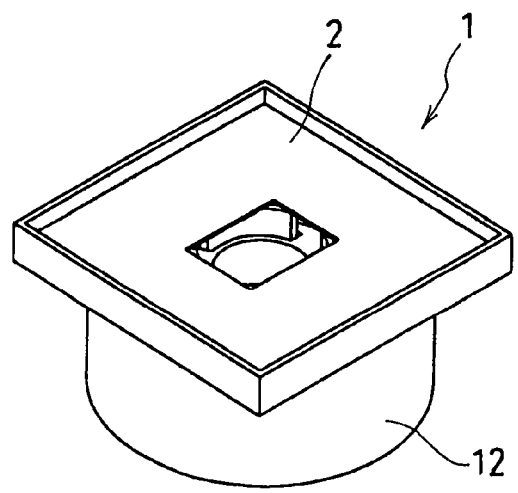
FIG. 2B is a perspective view of the lens driving apparatus of FIG. 1 seen from the bottom.
Figure 3:
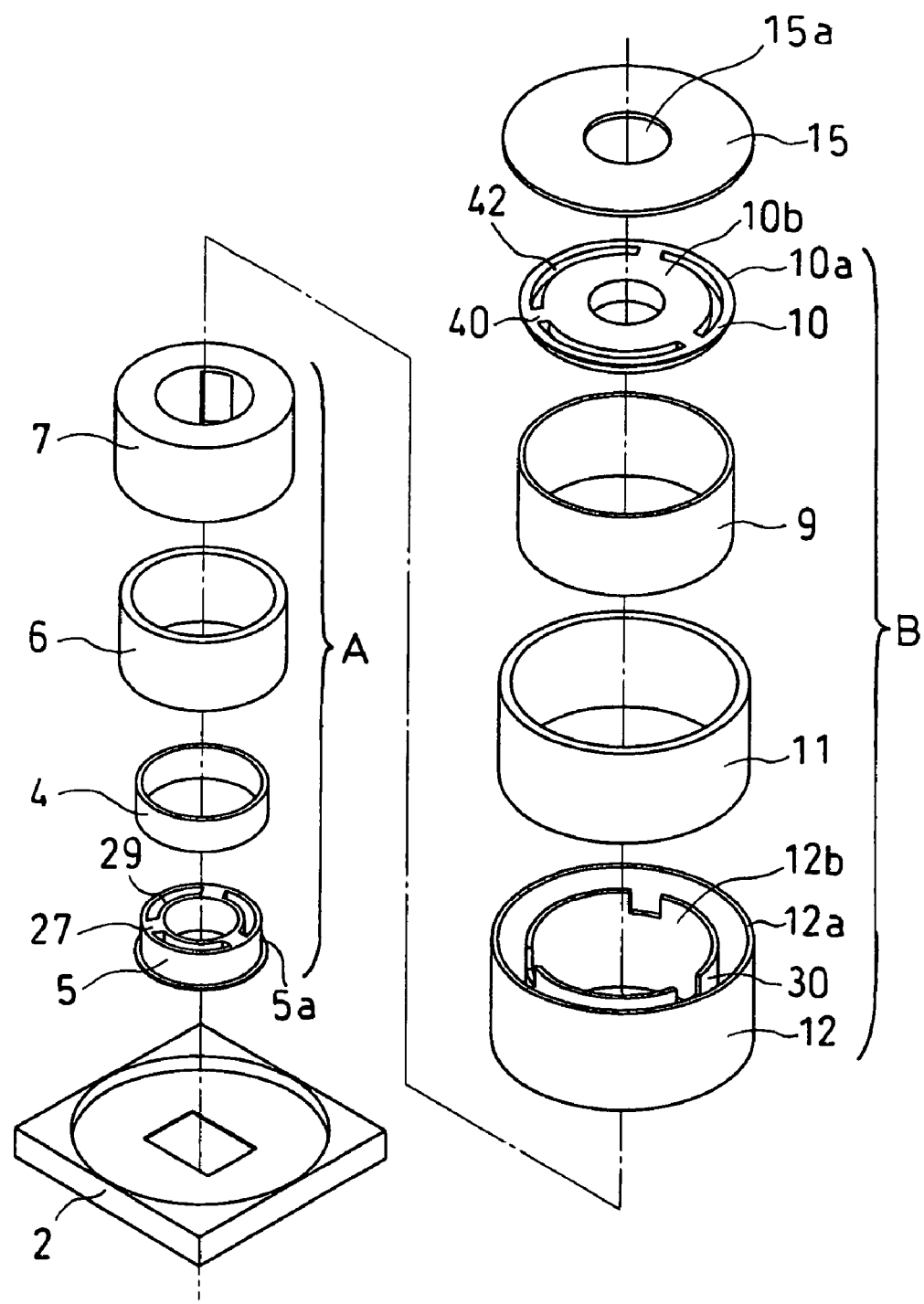
FIG. 3 is an exploded perspective view of the lens driving apparatus of FIG. 1.

FIGS. 1 to 3 show a first embodiment of the present invention.

A lens driving apparatus 1 according to the first embodiment is a lens driving apparatus for an autofocus camera incorporated into a cellular phone, and has a first lens driving section A and a second lens driving section B. The first lens driving section A has a first yoke 7 with a rectangular U-shape cross section and a cylindrical shape. The first yoke 7 is attached to a base 2.

The first yoke 7 has an inner peripheral wall 7b and an outer peripheral wall 7a, which are arranged to be substantially concentric with each other. The inner peripheral wall 7b has multiple slidably contacting portions 25 formed along a peripheral direction with a predetermined distance. In an interior of the rectangular U-shape of the first yoke 7, a magnet 6 is provided. Moreover, a coil 4 is provided at an inner peripheral side of the magnet 6 in the interior of the rectangular U-shape. In this case, the magnet 6 is fixed to the base 2 in a state that the magnet 6 is contained in a clearance between the inner peripheral wall 7b and the outer peripheral wall 7a.

A first lens support member 5 is placed at an inner peripheral side of the first yoke 7. The coil 4 is fixed to an outer periphery of the first lens support member 5. The lens support member 5 is substantially cylindrically shaped. The first lens support member 5 contains a lens 3 in its interior, and is provided at an inner peripheral side of the first yoke 7 to be movable along an optical axis.

Particularly, in the first embodiment, the first lens support member 5 is frictionally engaged with the first yoke 7 to be slid in a direction of the optical axis. More specifically, the first lens support member 5 has an inner peripheral wall 5b and an outer peripheral wall 5a, which are arranged to be substantially concentric with each other, and a division wall 27 that forms multiple divided spaces 29 between the inner peripheral wall 5b and the outer peripheral wall 5a by connecting the inner peripheral wall 5b to the outer peripheral wall 5a. The slidably contacting portions 25 of the first yoke 7 are individually contained in the spaces 29, so that each slidably contacting portion 25 comes into slidable contact with an inner surface of the outer peripheral wall 5a of the first lens support member 5. In addition, each slidably contacting portion 25 may come into slidable contact with an outer surface of the inner peripheral wall 5b.

On the other hand, the second lens driving section B has a second yoke 12 with a rectangular U-shape cross section and a cylindrical shape. The second yoke 12 is placed to be substantially concentric with the first yoke 7 at an outer side of the first yoke 7, and attached to the base 2 in such a way that a rectangular U-shape of the second yoke 12 is inverted relative to that of the first yoke 7. The second yoke 12 has an inner peripheral wall 12b and an outer peripheral wall 12a, which are arranged to be substantially concentric with each other. The inner peripheral wall 12b has multiple slidably contacting portions 30 formed along a peripheral direction with a predetermined distance. In an interior of the rectangular U-shape of the second yoke 12, a magnet 11 is provided. Moreover, a coil 9 is provided at an inner peripheral side of the magnet 11 in the interior of the rectangular U-shape. In this case, the magnet 11 is fixed to the base 2 in a state that the magnet 11 is contained in a clearance between the inner peripheral wall 12b and the outer peripheral wall 12a.

A second lens support member 10 is provided at an inner peripheral side of the second yoke 12. The coil 9 is fixed to an outer periphery of the second lens support member 10. The second lens support member 1 is substantially cylindrically shaped. The lens support member 10 contains a lens 8 in its interior, and is provided at an inner peripheral side of the second yoke 12 to be movable along the optical axis.

Particularly, in the first embodiment, the second lens support member 10 is frictionally engaged with the second yoke 12 to be slid in a direction of the optical axis. More specifically, the second lens support member 10 has an inner peripheral wall 10b and an outer peripheral wall 10a, which are arranged to be substantially concentric with each other, and a division wall 40 that forms multiple divided spaces 42 between the inner peripheral wall 10b and the outer peripheral wall 10a by connecting the inner peripheral wall 10b to the outer peripheral wall 10a. The slidably contacting portions 30 of the second yoke 12 are individually contained in the spaces 42, so that each slidably contacting portion 30 comes into slidable contact with an inner surface of the outer peripheral wall 10a of the second lens support member 10. In addition, each slidably contacting portion 30 may come into stable contact with an outer surface of the inner peripheral wall 10b.

In the aforementioned structure, the first lens support member 5 and the second lens support member 10 are positioned to be spaced from each other along the direction of the optical axis. Moreover, in such lens driving apparatus 1, the first and second lens support members 5 and 10 are linearly moved in the direction of the optical axis by an electromagnetic force (Fleming's left-hand rule) caused by passing an electric current through the coils 4 and 9.

In the first embodiment, since the first and second lens support members 5 and 10 are linearly moved in the direction of the optical axis by the electromagnetic force caused by passing an electric current through the coils 4 and 9, a direction of thrust matches a moving direction of a corresponding lens, so that an amount of drive loss is extremely small. This makes it possible to increase a moving speed of the lens and improve responsivity. Namely, since the lens driving apparatus 1 of this embodiment is excellent in terms of reduction in drive loss, responsivity, and mobility to allow the lens to be efficiently moved in the direction of the optical axis by a desired amount in a narrow space, the lens driving apparatus 1 is suitable for mounting on a small-sized camera.

Since the first yoke 7 and the second yoke 12 are arranged to be concentric with each other, miniaturization of the lens driving apparatus in its entirety can be improved. In addition, the magnets 6 and 11 and the coils 4 and 9, which are respectively contained in the yokes 7 and 12, are also arranged to be concentric with each other.

The lens support members 5 and 10 are moved by electromagnetic force. Unlike the conventional art, the lens support members 5 and 10 are not engaged with a gear and a cam groove to make it possible to prevent rattle due to an accuracy error of these members. Also, since a gear and cam are not provided, miniaturization can be improved.

The first lens support member 5 is frictionally engaged with the first yoke 7 by the slidably contacting portions 25, and the second lens support member 10 is frictionally engaged with the second yoke 12 by the slidably contacting portions 30, so that the first lens support member 5 and the second lens support member 10 are slid in the direction of the optical axis. This makes it possible to sufficiently satisfy a demand for excellent maintenance and mobility of the lens support members 5 and 10, delicate movement of a focus lens, and fixed magnification of a zoom lens.

The multiple slidably contacting portions 25 and 30 of the yokes 7 and 12 arranged in the peripheral direction come into stable contact with inner surfaces of the lens support members 5 and 10, respectively, thereby making it possible to obtain smooth sliding in a state that maintenance of the lens support members 5 and 10 to the yokes 7 and 12 is sufficiently ensured.

The slidably contacting portions 25 and 30 of the yokes 7 and 12 are individually contained in the divided spaces 29 and 42 of the lens support members 5 and 10, so that the slidably contacting portions 25 and 30 come into slidable contact with peripheral surfaces of the lens support members 5 and 10. Accordingly, rattle in a peripheral direction of the yokes 7 and 12 and the lens support members 5 and 10 can be surely prevented to make it possible to achieve linear movement of the lens support members 5 and 10 surely and satisfactorily.

The first lens support member 5 and the second lens support member 10 are positioned to be spaced from each other along the direction of the optical axis. For this reason, for example, when the zoom lens and the focus lens are supported by the first lens support member 5 and the second lens support member 10, a compact apparatus that has both an autofocus mechanism and a scaling function can be efficiently achieved.

Figure 4:
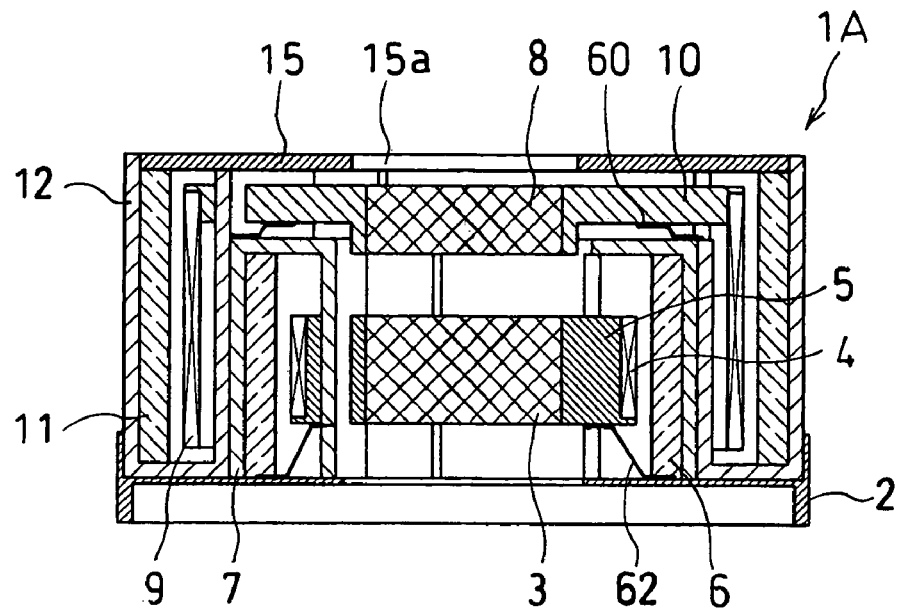
FIG. 4 is a sectional view of a lens driving apparatus according to a modification of the first embodiment of the present invention.

FIG. 4 illustrates a modification of the first embodiment. In this modification, the first and second lens support members 5 and 10 are held by springs 60 and 62. The springs 60 and 62 urge the first and second lens support members 5 and 10 to the base 2 in a state that no electric current is passed through the coils.

According to this structure, since the first and second lens support members 5 and 10 are held by the springs 60 and 62, there is no need to cause the lens support members 5 and 10 to be held by the yokes 7 and 12 in a slidable contact manner.

According to this modification, maintenance of the lens support members 5 and 10 to the yokes 7 and 12 can be sufficiently secured. Moreover, in a case where, for example, shaking and impact occur at a time of carrying the camera, shaking and rattle are less likely to be generated in the lens support members to provide excellent impact resistance.

Though the following will explain other embodiments, the same reference numerals as those of the first embodiment are added to portions that bring the same operation and working-effect as those of the first embodiment, and a specific explanation thereof is omitted, while points different from the first embodiment are mainly explained.

Second Embodiment

Figure 5:
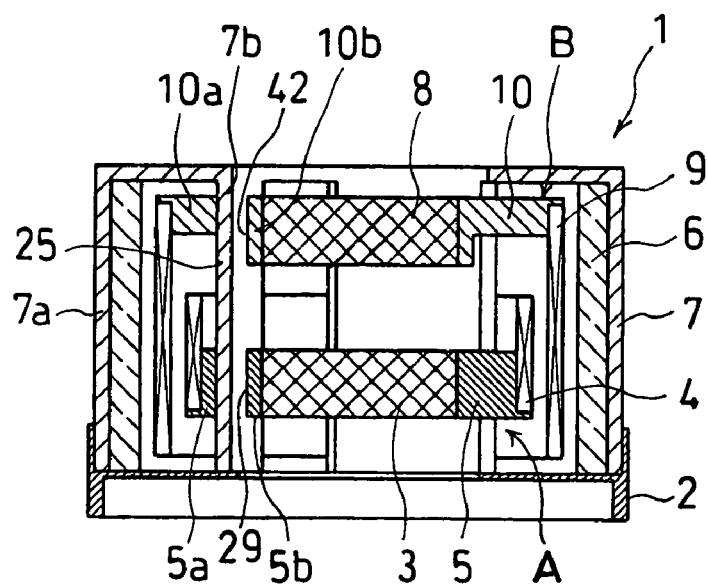
FIG. 5 is a sectional view of a lens driving apparatus according to a second embodiment of the present invention.
Figures 6A, 6B:
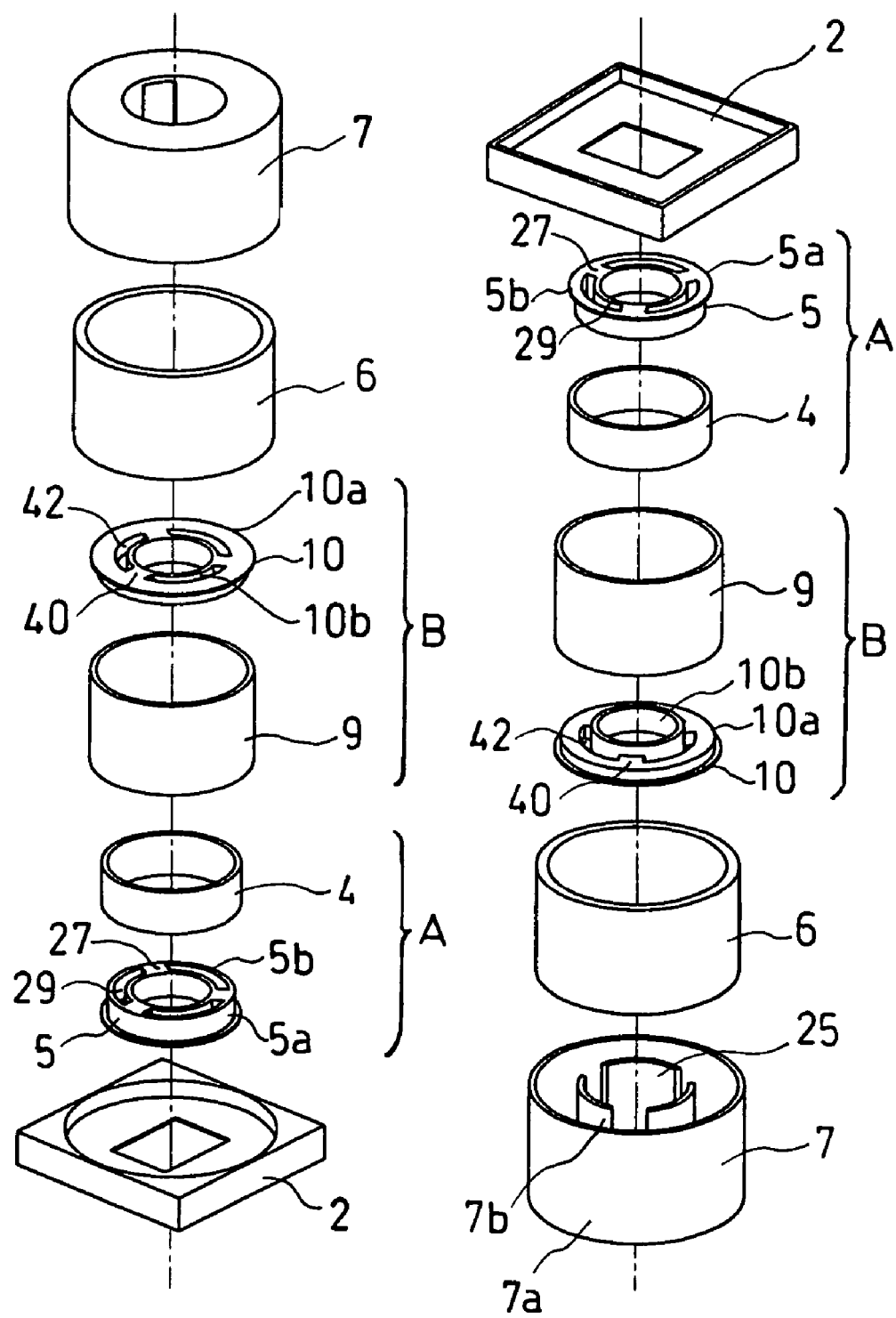
FIG. 6A is a perspective view of the lens driving apparatus of FIG. 5 seen from the top.
FIG. 6B is a perspective view of the lens driving apparatus of FIG. 5 seen from the bottom.

FIGS. 5 and 6 illustrate a second embodiment of the present invention. In the second embodiment, second lens driving section B shares yoke 7 and magnet 6 with first lens driving section A, and has first coil 4 positioned at an inner peripheral side of second coil 9 of the second lens driving section B. The second coil 9 is formed as a long pipe that encloses the first coil 4 externally. The first coil 4 is formed as a short pipe that completely fits in an interior of the second coil 9.

Moreover, the first coil 4 is fixed to an outer periphery of first lens support member 5 positioned at an inner peripheral side of the second coil 9. The first lens support member 5 is substantially cylindrically shaped and contains lens 3 in its interior, and is attached to be slidable on an inner peripheral side of the yoke 7 along an optical axis.

The second embodiment can obtain the same effect as that of the first embodiment. More specifically, since first and second lens support members 5 and 10 are linearly moved in the direction of the optical axis of the lens by an electromagnetic force caused by passing an electric current through the coils 4 and 9, a direction of thrust matches a moving direction of the lens support member (lens), so that an amount of drive loss is extremely small.

Moreover, in the second embodiment, one yoke 7 and one magnet 6 are shared in the first and second lens support members 5 and 10, and the first and second coils 4 and 9 are added thereto. Accordingly, as compared with a case in which yokes and magnets are provided in the first and second support members 5 and 10 (first and second coils 4 and 9), respectively, an outer diameter of lens driving apparatus 1 in its entirety can be reduced to make it possible to miniaturize the lens driving apparatus 1.

Figure 7:
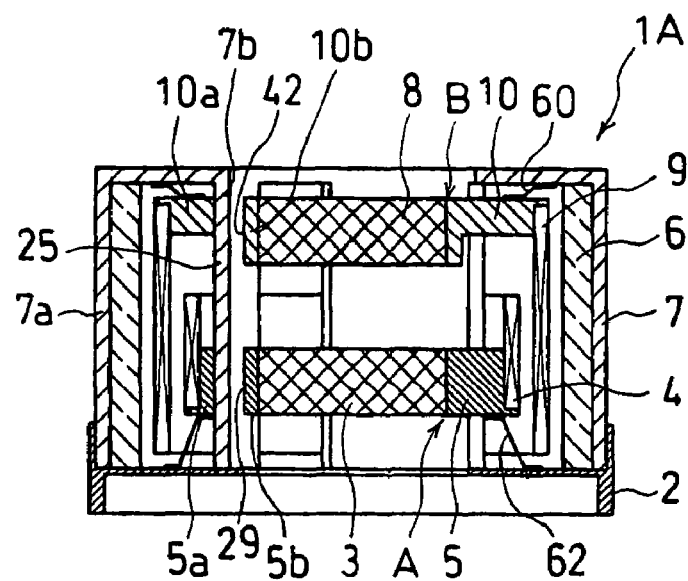
FIG. 7 is a sectional view of a lens driving apparatus according to a modification of the second embodiment of the present invention.

FIG. 7 illustrates a modification of the second embodiment. In this modification of the second embodiment, the first and second lens support members 5 and 10 are held by springs 60 and 62. The springs 60 and 62 urge the first and second lens support members 5 and 10 to base 2 in a state that no electric current is passed through the coils. In addition, other structural elements are the same as those of the second embodiment.

According to this modification, since the first and second lens support members 5 and 10 are held by springs 60 and 62, there is no need to cause the lens support members 5 and 10 to be held by the yoke 7 in a slidable contact manner.

Third Embodiment

Figure 8:
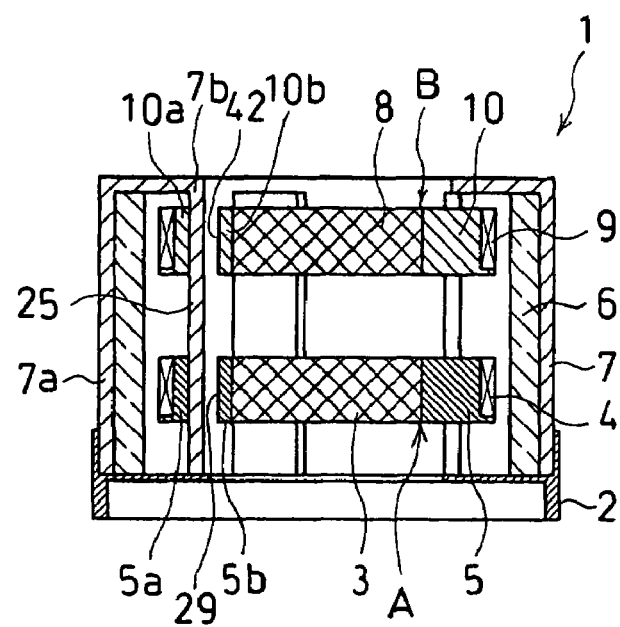
FIG. 8 is a sectional view of a lens driving apparatus according to a third embodiment of the present invention.
Figure 9A:
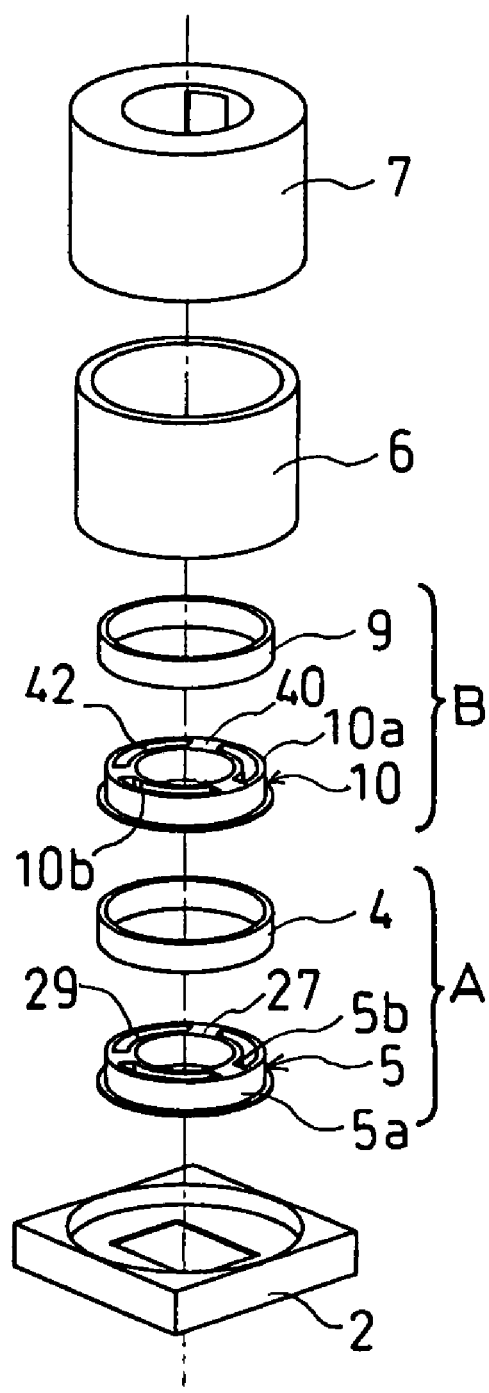
FIG. 9A is a perspective view of the lens driving apparatus of FIG. 8 seen from the top.
Figure 9B:
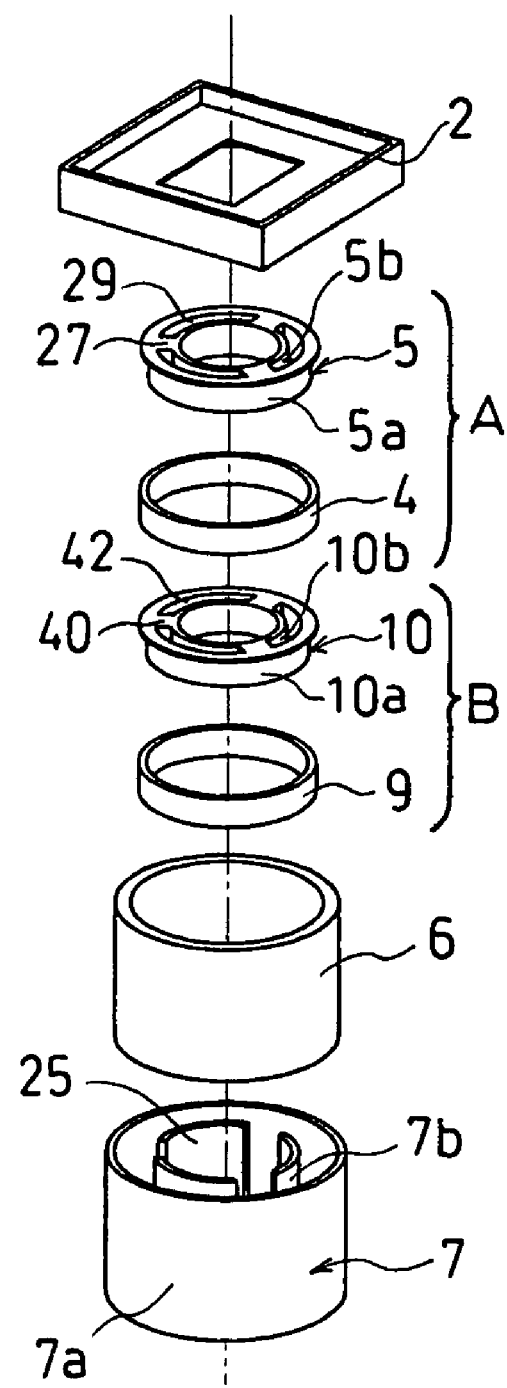
FIG. 9B is a perspective view of the lens driving apparatus of FIG. 8 seen from the bottom.

FIGS. 8 and 9A-9B illustrate a third embodiment of the present invention. In the third embodiment, unlike the aforementioned embodiment, no second yoke 12 is provided and only yoke 7 is provided. Second lens support member 10 is placed at an inner peripheral side of the yoke 7. Second coil 9 is fixed to an outer periphery of the second lens support member 10. The second lens support member 10 is substantially cylindrically shaped and contains lens 8 in its interior, and is attached to be slidable on the inner peripheral side of the yoke 7 along an optical axis.

In the third embodiment, a distance between magnet 6 and the second coil 9 is set to be substantially equal to a distance between the magnet 6 and first coil 4.

The third embodiment also has the same effect as that of the first embodiment. More specifically, since first and second lens support members 5 and 10 are linearly moved in a direction of the optical axis of a lens by an electromagnetic force caused by passing an electric current through the coils 4 and 9, a direction of thrust matches a moving direction of a corresponding lens support member (lens), so that an amount of drive loss is extremely small.

Moreover, in the third embodiment, one yoke 7 and one magnet 6 are shared in the first and second lens support members 5 and 10, and the first and second coils 4 and 9 are added thereto. Accordingly, as compared with the case in which the yokes and magnets are provided in the first and second support members 5 and 10 (first and second coils 4 and 9), respectively, an outer diameter of lens driving apparatus 1 in its entirety can be reduced to make it possible to miniaturize the lens driving apparatus 1.

Furthermore, in this embodiment, since the distance between the magnet 6 and the second coil 9 is set to be substantially equal to the distance between the magnet 6 and the first coil 4, a magnetic force equally acts on the first and second coils 4 and 9 of the first and second support members 5 and 10 from the magnet 6. For this reason, no variation occurs in a moving speed of the first and second lens support members in the direction of the optical axis. Moreover, both the first and second coils 4 and 9 can be arranged to be close to the magnet 6, thereby making it possible to cause a strong magnetic force to act on the first and second coils 4 and 9 and improve thrust.

Figure 10:
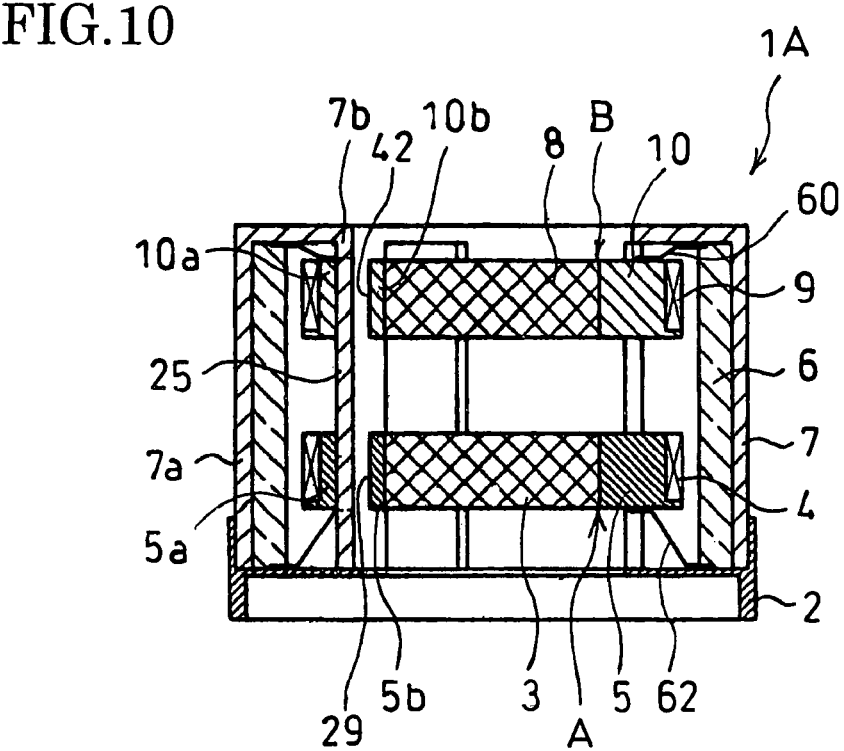
FIG. 10 is a sectional view of a lens driving apparatus according to a modification of the third embodiment of the present invention.

FIG. 10 illustrates a modification of the third embodiment. In this modification, the first and second lens support members 5 and 10 are held by springs 60 and 62. The springs 60 and 62 urge the first and second lens support members 5 and 10 to base 2 in a state that no electric current is passed through the coils. In addition, other structural elements are the same as those of the first embodiment.

According to this modification, since the first and second lens support members 5 and 10 are held by springs 60 and 62, there is no need to cause the lens support members 5 and 10 to be held by the yoke 7 in a slidable contact manner. However, combination with slidably contacting and holding structure in this embodiment may be possible.

According to this modification, maintenance of the lens support members 5 and 10 to the yoke 7 can be sufficiently secured. Moreover, in a case where, for example, shaking and impact occur at a time of carrying the camera, shaking and rattle are less likely to be generated in the lens support members to provide excellent impact resistance.

Fourth Embodiment

Figure 11:
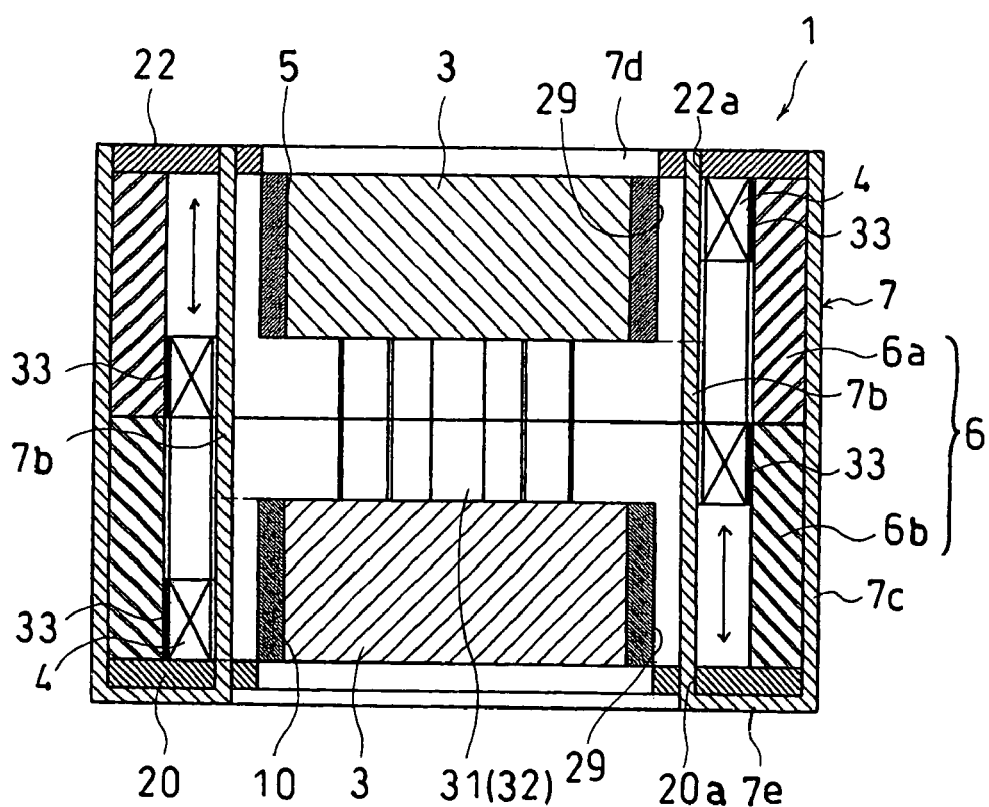
FIG. 11 is a longitudinal sectional view of a lens driving apparatus according to a fourth embodiment of the present invention.
Figure 12:
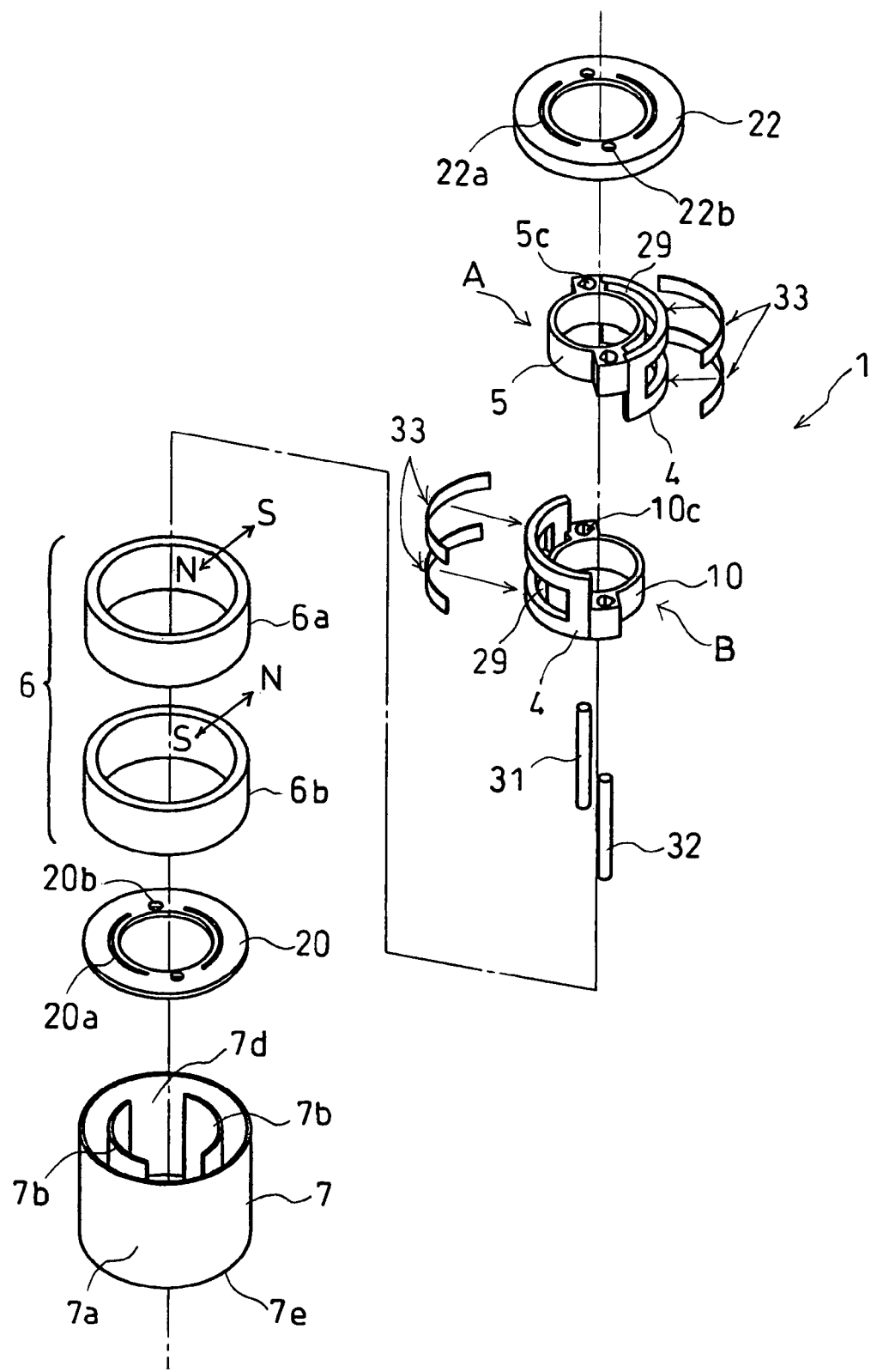
FIG. 12 is an exploded perspective view of the lens driving apparatus of FIG. 11.
Figure 13:
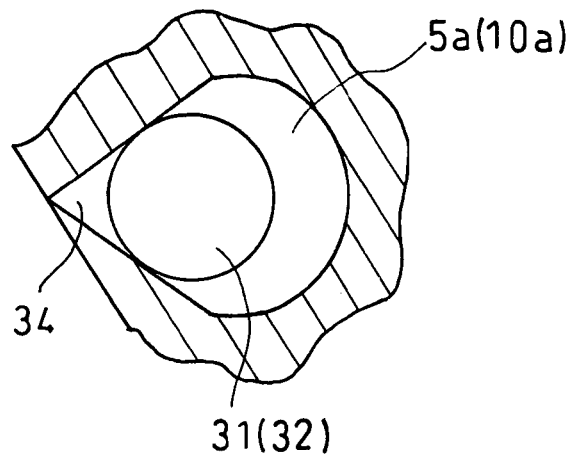
FIG. 13 is an enlarged sectional view of a main part of an abutting portion between a guide shaft and a lens support member.
Figure 14:
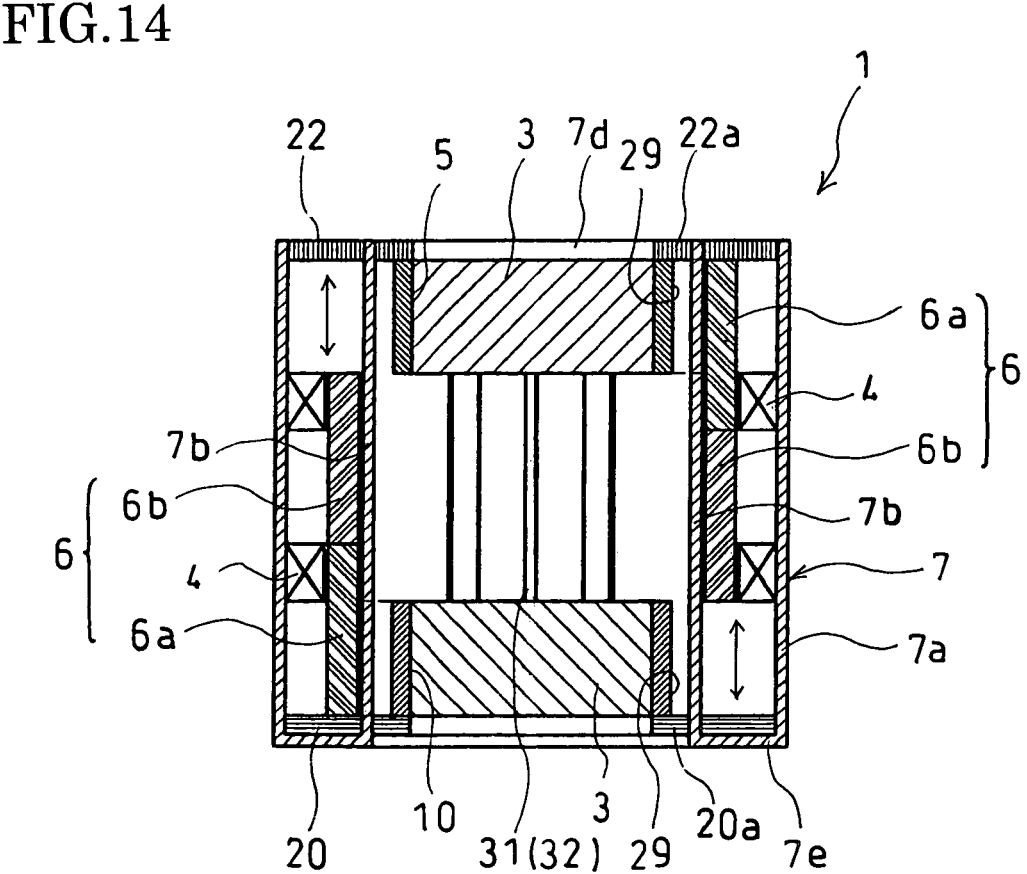
FIG. 14 is a longitudinal sectional view of a lens driving apparatus according to a modification of the fourth embodiment of the present invention.
Figure 15:
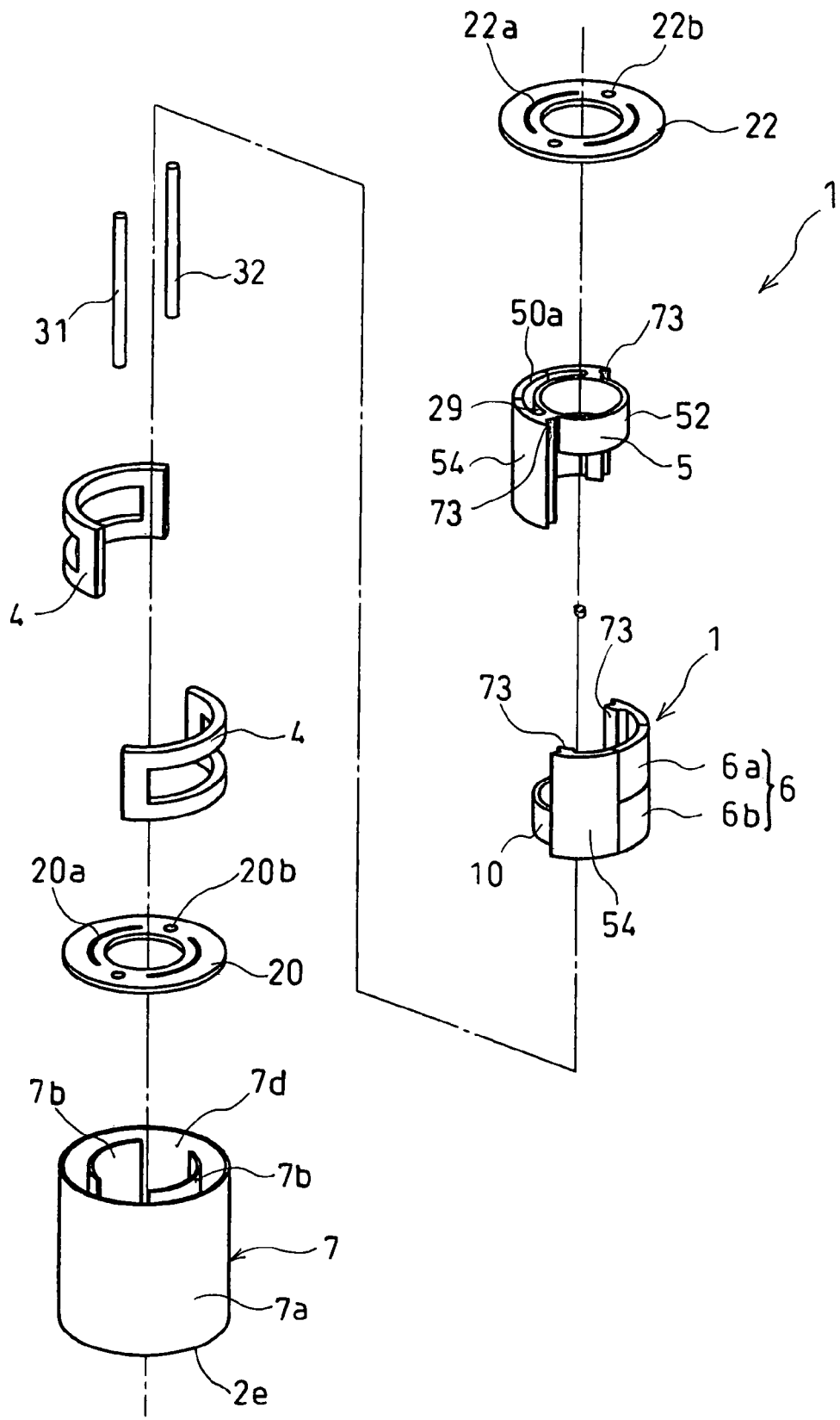
FIG. 15 is an exploded perspective view of the lens driving apparatus of FIG. 14.

FIGS. 11 to 13 illustrate a fourth embodiment of the present invention. Lens driving apparatus 1 according to the fourth embodiment is a coil movable type lens driving apparatus, and includes cylindrical yoke 7. The yoke 7 has a pair of support walls (inner peripheral walls) 7b, 7b axially extending in the yoke 7. These support walls 7b, 7b are opposite to each other in such a way to form an arc around a central axis of the yoke 7.

Moreover, annular spacers 20 and 22 are formed on an upper end opening portion 7d and a bottom surface 7e of the yoke 7, respectively. These spacers 20 and 22 have a pair of slits 20a, 20a (22a, 22a), to which the support walls 7b, 7b are individually inserted, and a pair of circular support holes 20b, 20b (22b, 22b) which support end portions of a pair of guide shafts 31 and 32 to be described later.

In the yoke 7, cylindrical lens support members 5 and 10, which are movable along an axial direction of the yoke 7, are contained to be concentric with each other. In this case, the lens support members 5 and 10 are arranged to be spaced from each other along a direction of an optical axis.

Moreover, a cylindrical magnet 6 is adhered to an inner surface of the outer peripheral wall 7a of the yoke 7. In this case, the magnet 6 includes two cylindrical magnet portions 6a and 6b arranged along a moving direction of the lens support members 5 and 10. Regarding respective magnet portions 6a and 6b, polarities of their surface and back are different from each other. Moreover, polarities of adjacent surfaces of the magnetic portions 6a and 6b are also different from each other.

Furthermore, an arc coil 4 is adhered to the lens support members 5 and 10. The coil 4 extends along a part of a peripheral direction of the lens support members 5 and 10. Also, the coil 4 holds arc magnetic members (a pair of iron pieces in this embodiment) 33 which generate magnetic attraction between the coil 4 and the magnet 6. In other words, in this embodiment, respective lens support members 5, 10, the coil 4 and the magnetic members 33 are combined to form one pair of lens driving members A and B. In addition, as is obvious from FIG. 12, one lens driving member A is placed in such a way that the other lens driving member B is rotated by 180° to be upside down. Accordingly, lens support members 5 and 10 always receive magnetic attraction acting between held magnetic member 33 and the magnet 6 in directions opposite to each other.

Moreover, in this embodiment, there is provided a guiding section that guides linear movement of the lens support members 5 and 10. More specifically, the guiding section includes the support walls 7b, 7b of the yoke 7 and an arc space 29 formed between the arc coil 4 and cylindrical lens support members 5 and 10. Then, the support walls 7b, 7b are individually passed through the space 29 of each of the lens support members 5 and 10 to support each of the lens support members 5 and 10 to guide with a predetermined degree of clearance.

Furthermore, in this embodiment, there is provided the pair of guide shafts 31 and 32 abutting the lens support members 5 and 10, which receive magnetic attraction, to space the magnetic members 33 from the magnet 6 in a radial direction by a predetermined distance. Moreover, these guide shafts 31 and 32 pass through a pair of through holes 5c, 5c (10c, 10c) formed at the lens support members 5 and 10 to extend, and both their ends are supported by support holes 20b, 20b (22b, 22b) of the spacers 20 and 22. Each of the guide shafts 31 and 32 has a circular cross section. Furthermore, an inner surface portion (abutted surface) 34 of each of the through holes 5c, 5c of the lens support members 5 and 10, which are abutted against the guide shafts 31 and 32 by magnetic attraction, is wedge-shaped as illustrated in FIG. 13. In addition, the guide shafts 31 and 32 function as a guiding section that guides movement of the lens support members 5 and 10.

According to the above structure, when current is passed through the coil 4, the lens support members 5 and 10, which hold the coil 4, are linearly moved along a direction, where the magnet portions 6a and 6b are arranged, by an electromagnetic force induced by a magnetic field formed by the current and the magnet 6. Also, the lens support members 5 and 10 always receive a magnetic urging force (attraction directing to an outer side in a radial direction) from the magnet 6 through the magnetic members 33 at both a moving time and stopping time. Accordingly, when magnitude in the current flowing into the coil 4 or a magnetic force of the magnet 6 is adjusted in such a way to generate thrust (electromagnetic force) exceeding an engagement frictional force between the guide shafts 31, 32 and the lens support members 5, 10 caused by attraction, the lens support members 5 and 10 can be magnetically moved as receiving the attraction.

As explained above, in the lens driving apparatus 1 of this embodiment, since the cylindrical lens support members 5 and 10 are concentrically contained in the cylindrical yoke 7, and the cylindrical magnet 6 and the arc coil 4, which move these lens support members 5 and 10, are built in, an extremely compact lens driving apparatus can be achieved.

Moreover, the lens support members 5 and 10 are linearly moved by the electromagnetic force induced by the magnetic filed formed by the current flowing into the coil 4 and the magnet 6 as always receiving magnetic attraction acting between the magnet 6 and the magnetic members 33. In this way, when the attraction always acts on the lens support members 5 and 10, the lens support members 5 and 10 can be prevented from being shifted by impact. Also, movement of the lens support members 5 and 10 can be stabilized, so that the lens support members 5 and 10 can be correctly moved by a desired amount. In other words, maintenance of the lens support members 5 and 10 can be sufficiently secured, and even when shaking and impact occur, shaking and rattle are less likely to be generated in the lens support members to provide excellent impact resistance. Accordingly, this makes it possible to sufficiently satisfy a demand for excellent maintenance and mobility of the lens support members 5 and 10, delicate movement of a focus lens, and fixed magnification of a zoom lens.

Furthermore, in this embodiment, the magnet 6 fixed to the yoke 7 is cylindrically shaped and the coil 4 and the magnetic members 33, which are fixed to the lens support members 5 and 10, are formed in an arc shape. For this reason, the magnetic attraction and electromagnetic force can be efficiently caused to act on the lens support members 5 and 10. Also, the attraction is caused to act on the lens support members 5 and 10 in directions opposite to each other, so that no bias force works on the yoke 7, which supports the lens support members 5 and 10.

Moreover, in this embodiment, since the guide shafts 31 and 32 that guide linear movement of the lens support members 5 and 10 are provided, the lens support members 5 and 10 can be stably moved. Particularly, in this embodiment, a guide section includes the support walls 7b, 7b, which are arc-shaped and axially extend in the yoke 7, and the space 29, which is formed between the arc coil 4 and the cylindrical lens support members 5 and 10 and through which corresponding support walls 7b, 7b are individually passed. This makes it possible to surely prevent rattle in a peripheral direction of the yoke 7 and the lens support members 5 and 10, and achieve linear movement of the lens support members 5 and 10 surely and satisfactorily.

Furthermore, in the present embodiment, the magnet 6 includes the magnet portions 6a and 6b arranged along the moving direction of the lens support members 5 and 10, and the polarities of the magnet portions 6a and 6b adjacent each other in a direction of arrangement are different from each other. This makes it possible to generate an electromagnetic force (thrust) in the same direction over an entire length of a passage where the lens support members 5 and 10 are moved and achieve satisfactory linear movement.

Still furthermore, there are provided the guide shafts 31 and 32 that cause the magnetic members 33 and the magnet 6 to be spaced from each other in a radial direction by a predetermined distance by abutting the lens support members 5 and 10, which receive magnetic attraction. This makes it possible to prevent absorption of the magnet 6 and the magnet members 33. This also makes it possible to cause suitable attraction by which no trouble is given to linear movement to act on the lens support members 5 and 10. Also, the guide shafts 31 and 32 guide movement of the lens support members 5 and 10 in cooperation with the yoke 7 to further stabilize movement of the lens support members 5 and 10.

Moreover, in this embodiment, cross sections of the guide shafts 31 and 32 are circular, and abutting surfaces 34 of the lens support members 5 and 10, which are abutted against the guide shafts 31 and 32 by the magnetic attraction, are wedge-shaped. Accordingly, the lens support members 5 and 10 come into contact with the shafts 31 and 32 with a fixed pressure to make it possible to stably and smoothly move the lens support members 5 and 10 along the guide shafts 31 and 32.

FIGS. 14 to 16B illustrate a modification of this embodiment. This modification includes the cylindrical yoke 7. The yoke 7 has a pair of support walls 7b, 7b axially extending in the yoke 7. These support walls 7b, 7b are opposite to each other in such a way to form an arc around a central axis of the yoke 7 and generate magnetic attraction between magnet 6 and the support walls 7b, 7b.

In the yoke 7, cylindrical lens support members 5 and 10, which are movable along an axial direction of the yoke 7, are contained to be concentric with each other. In this case, the lens support members 5 and 10 are arranged to be spaced from each other along a direction of an optical axis.

Moreover, two arc coils 4 are adhered to an inner surface of the outer peripheral wall 7a of the yoke 7. In this case, these coils 4 extend to be opposite to each other along a part of the peripheral direction of outer peripheral wall 7a.

Figure 16A:
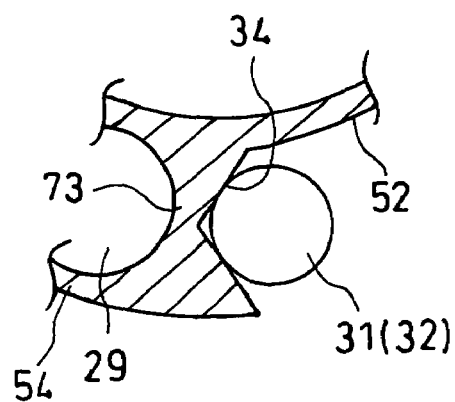
FIGS. 16A-16B are views illustrating a characterized portion of the lens driving apparatus of FIG. 14, with FIG. 16A being an enlarged sectional view of a main part of an abutting portion between a guide shaft and a lens support member, and with FIG. 16B being an exploded perspective view of a driving member.
Figure 16B:
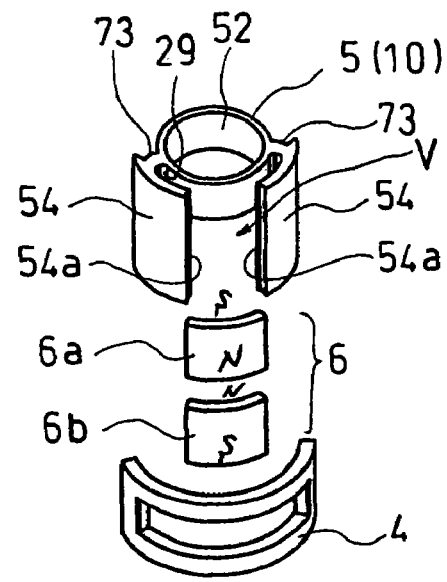

Furthermore, as illustrated in FIGS. 16A and 16B, the lens support members 5 and 10 each have projection walls 73, which project from an outer peripheral wall 52 in a radial direction, and coil support walls 54, 54, which extend with a predetermined length along a peripheral direction from an outer end of a corresponding projection wall 73. In these coil support walls 54, 54, their end surfaces 54a, 54a are opposite to each other and an arrangement space V where the magnet 6 can be placed between these end surfaces 54a and 54a without clearance. Then, the magnet 6 is placed to be adhered to the arrangement space V, so that arc space 29 is formed among the magnet 6, the coil support walls 54, 54 and the outer peripheral wall 52. Namely, in this embodiment, the lens support members 5 and 10 and the magnet 6 are combined to form one driving member. In addition, first lens support member 5 is placed in such a way that second lens support member 10 is rotated by 180° to be upside down. Accordingly, the lens support members 5 and 10 always receive magnetic attraction acting between the support walls 7a, 7b of the yoke 7 having the magnetic members and the magnet 6 in directions opposite to each other. Moreover, in this modification, the magnet 6 includes two arc magnet portions 6a and 6b arranged along a moving direction of the lens support members 5 and 10. Regarding respective magnet portions 6a and 6b, polarities of their surface and back are different from each other. Moreover, polarities of adjacent surfaces of the magnetic portions 6a and 6b are also different from each other.

Moreover, in this modification, there is provided a guiding section that guides linear movement of the lens support members 5 and 10. More specifically, the guiding section includes the support walls 7b, 7b of the yoke 7 and the arc space 29 formed among the magnet 6, the coil support walls 54, 54 and the outer peripheral wall 52. Then, the support walls 7b, 7b are individually passed through the space 29 of the lens support members 5 and 10 to individually support the lens support members 5 and 10 to guide with a predetermined degree of clearance.

In this modification, the lens support members 5 and 10 always receive a magnetic urging force (attraction directing to an outer side in a radial direction) acting between the support walls 7a, 7a and the magnet at both a moving time and stopping time.

Fifth Embodiment

Figure 17:
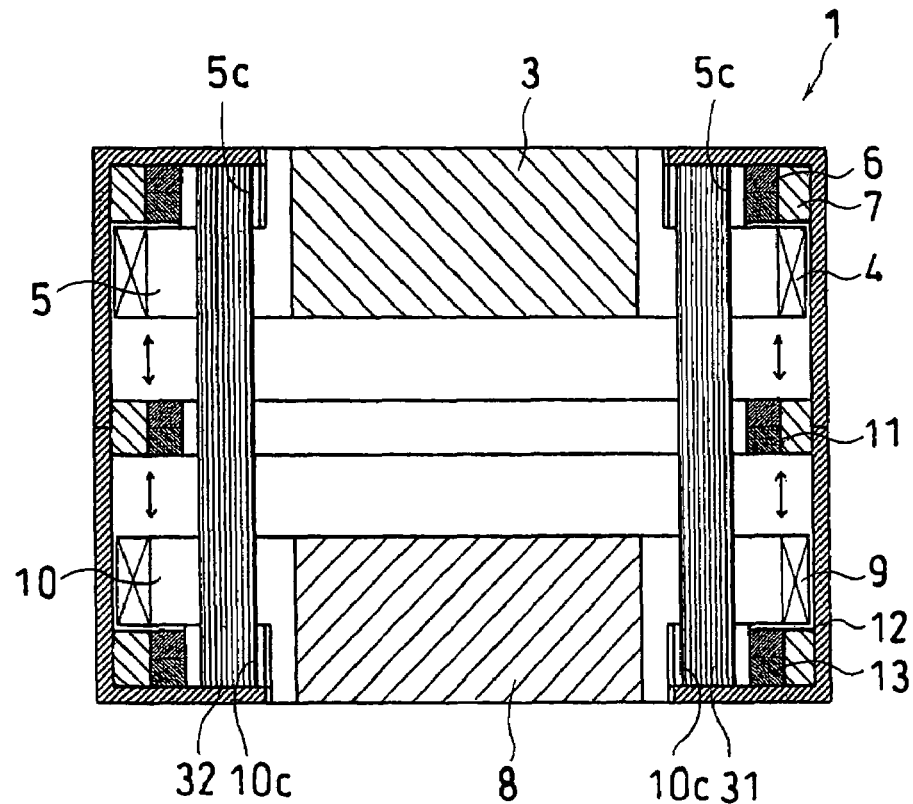
FIG. 17 is a longitudinal sectional view of a lens driving apparatus according to a fifth embodiment of the present invention.
Figure 18:
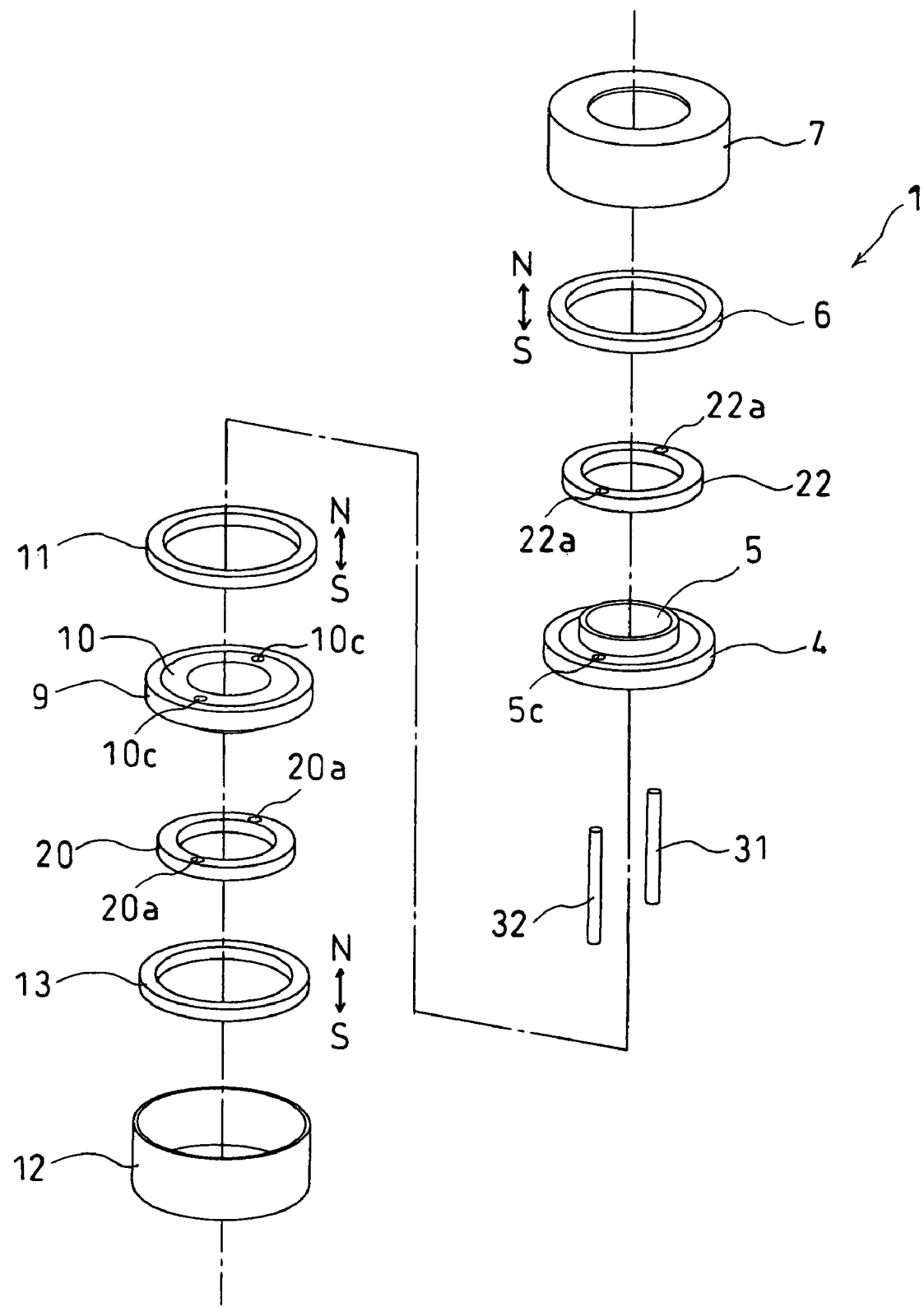
FIG. 18 is an exploded perspective view of the lens driving apparatus of FIG. 17.
Figure 19A:
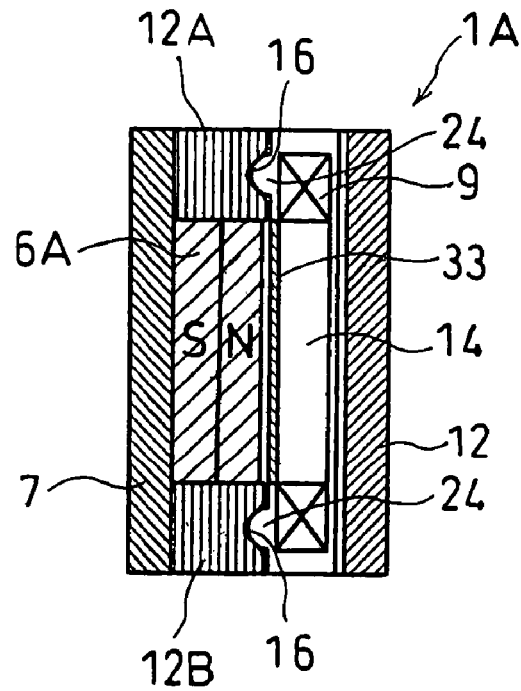
FIG. 19A is a transverse sectional view of a lens driving apparatus according to a sixth embodiment of the present invention.
Figure 19B:
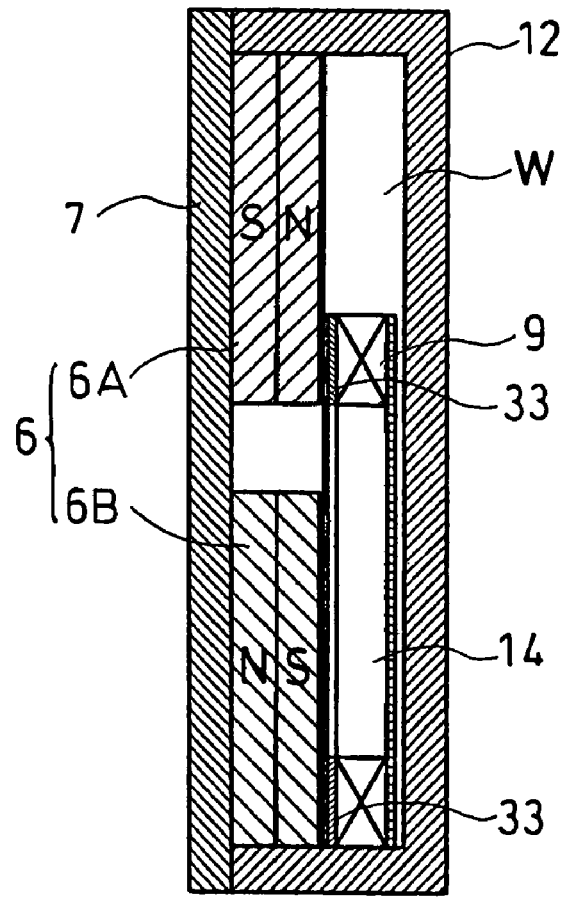
FIG. 19B is a longitudinal sectional view of the lens driving apparatus according to a sixth embodiment of the present invention.
Figure 20:
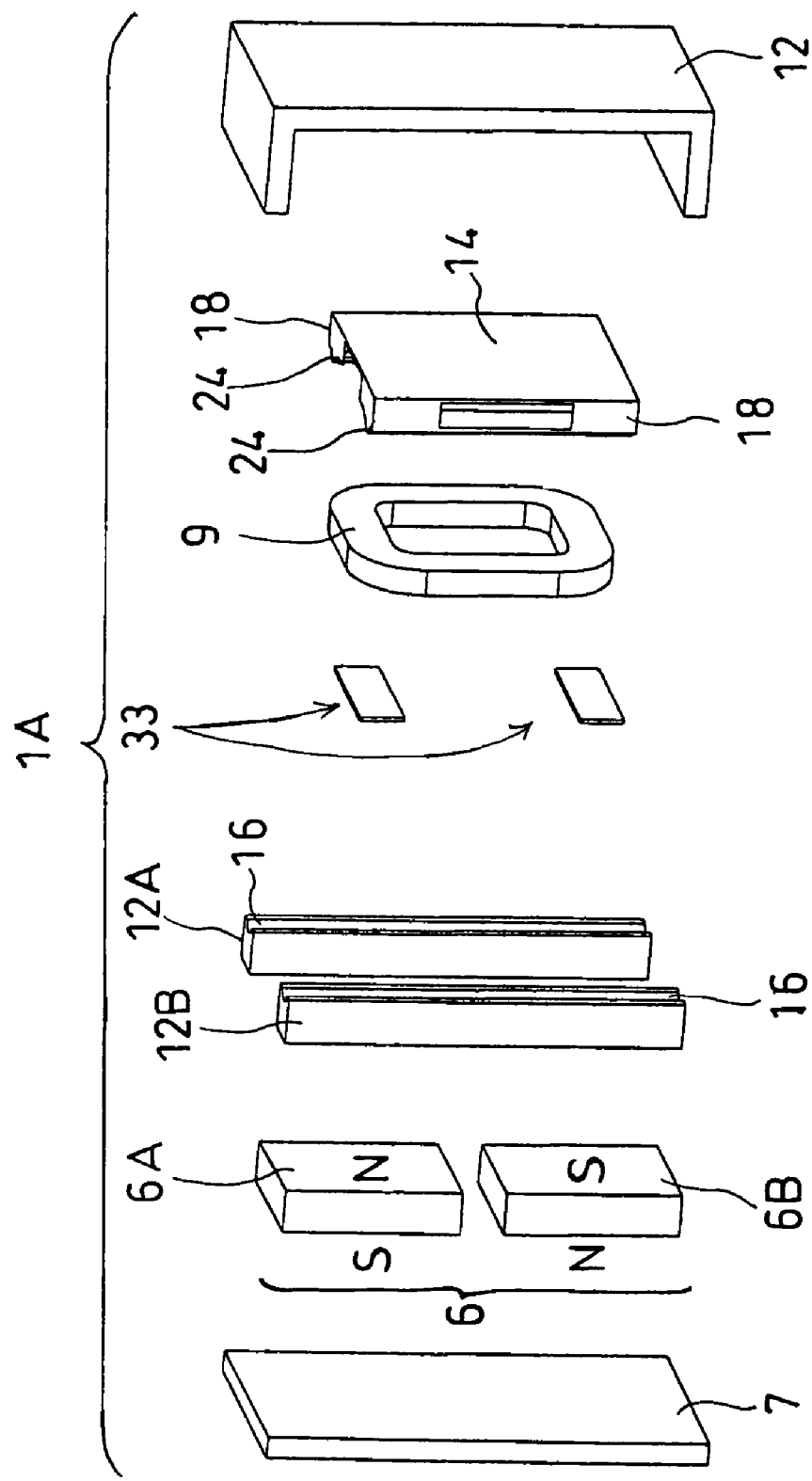
FIG. 20 is an exploded perspective view of the lens driving apparatus of FIGS. 19A-19B.
Figure 21:
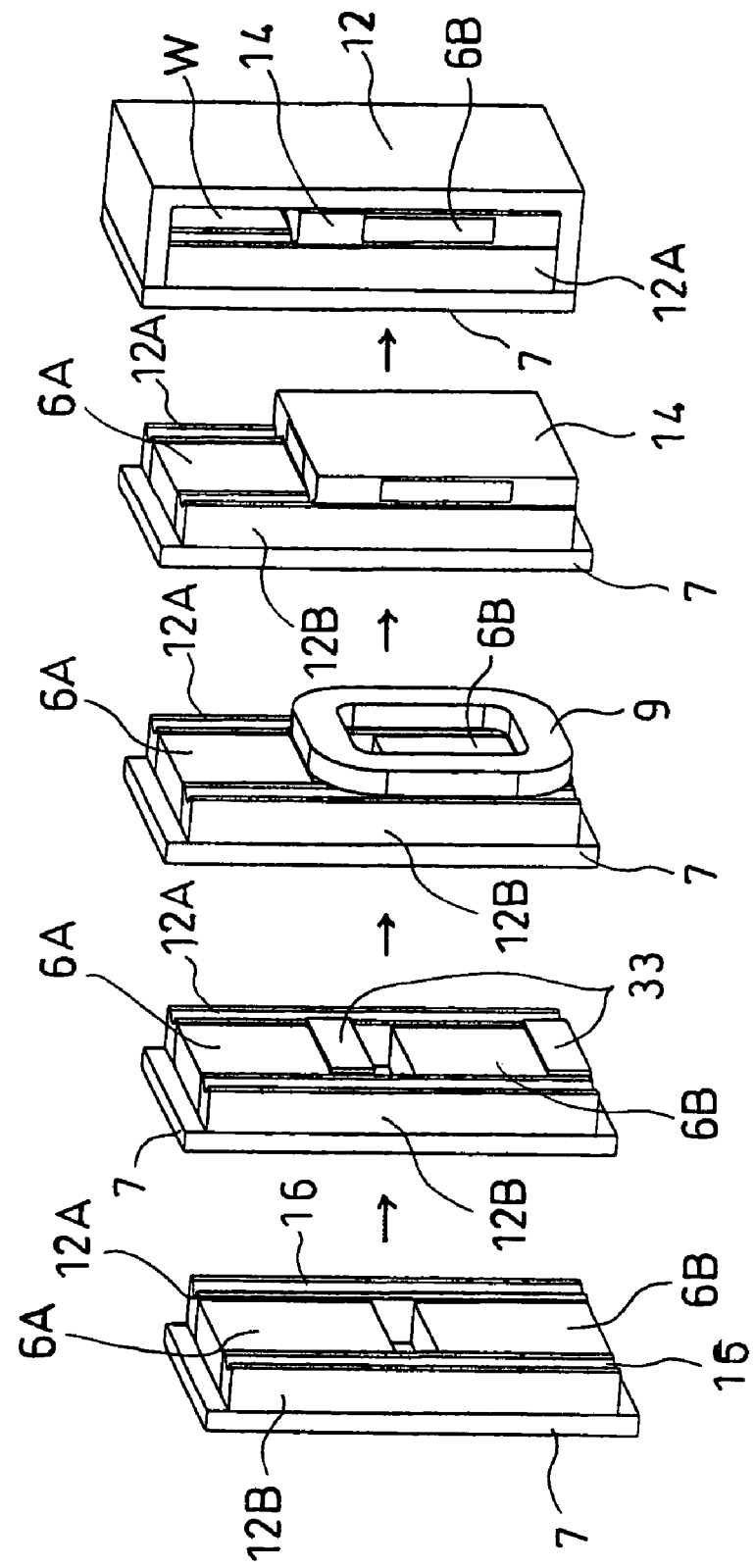
FIG. 21 is a perspective view illustrating one example of assembly steps of the lens driving apparatus of FIGS. 19A-19B.

A fifth embodiment will be explained with reference to FIGS. 17 and 18. Lens driving apparatus 1 according to the fifth embodiment includes cylindrical yokes 7 and 12 having rectangular U-shape cross sections axially adhered to each other to be opposite to each other. In a cylindrical space formed by these yokes, three first, second and third annular magnets 6, 11, 13, which are arranged to be spaced from one another along an axial direction of the yokes 7 and 12, are contained to be concentric with each other. In this case, respective magnets 6, 11, 13 are axially spaced from one another with an equal distance. Also, the magnets 6, 11, 13 are adhered to inner surfaces of the yokes 7 and 12 and their upper surfaces are set to the north pole and their lower surfaces are set to the south pole. Though the magnetic poles may be, of course, reversely set, the upper surfaces of any magnet 6, 11, 13 are set to be the same pole and the lower surfaces thereof are also set to be the same pole.

First lens support member 5, which is formed to hold annular first coil 4 on its outer periphery, is provided to be movable between the first magnet 6 and the second magnet 11. Also, second lens support member 10, which is formed to hold annular second coil 9 on its outer periphery, is provided to be movable between the second magnet 11 and the third magnet 13. Accordingly, the first lens support member 5 can be linearly moved by current flowing into the first coil 4 and an electromagnetic force (so-called right-handed screw rule) induced by a magnetic field formed by the first magnet 6 and the second magnet 11. Simultaneously, the second lens support member 10 can be linearly moved by current flowing into the first coil 4 and an electromagnetic force induced by a magnetic field formed by the second magnet 11 and the third magnet 13. In addition, spacer 20 is placed between the lens support member 10 and the third magnet 13, and spacer 22 is placed between the lens support member 5 and the first magnet 6. Also, the lens support members 5 and 10 hold lenses 3 and 8.

Moreover, in this embodiment, there is provided a guiding section that guides linear movement of the lens support members 5 and 10. More specifically, the guiding section is shared in two lens support members 5 and 10, and includes a pair of shafts 31 and 32 passing through the lens support members 5 and 10 in an axial direction. In this case, the shafts 31 and 32 pass through a pair of through holes 5c, 5c and 10c, 10c formed in the lens support members 5 and 10, a pair of through holes 20a, 20a and 22a, 22a of the spacers 20 and 22 to extend in the axial direction, individually.

As explained above, according to the lens driving apparatus 1 of this embodiment, two magnetic field spaces are formed to be adjacent each other axially in the cylindrical yokes 7 and 12 by the three annular magnets 6, 11, 13 which are arranged to be concentric with one another. Also, the two cylindrical lens support members 5 and 10 are made to correspond to these magnetic field spaces and be moved individually. This makes it possible to achieve linear movement of a pair of lenses with an extremely compact structure. Moreover, an interior of the yokes 7 and 12 is divided in the axial direction to individually form the magnetic field spaces where respective lens support members 5 and 10 are moved. For this reason, even when both the lens support members 5 and 10 are moved at the same time, influence on the coils 4 and 9 caused by a magnetic repulsion and the like can be suppressed to a minimum. In other words, for example, when two lens support members are moved in a common magnetic field space, there occurs trouble in terms of movement of the two lens support members by magnetic interaction between the coils. However, when the magnetic field space where the respective lens support members 5 and 10 are moved is individually divided, such trouble can be suppressed to a minimum.

Furthermore, in this embodiment, since three magnets 6, 11, 13 are axially spaced from one another with an equal distance, attenuation of an electromagnetic force accompanied by movement of the lens support members 5 and 10 can be suppressed to a minimum. In other words, when the two lens support members 5 and 10 are moved in one magnetic field space formed by the first magnet 6 and the third magnet 13 without placing the second magnet 11 between the first magnet 6 and the third magnet 13, the greater the space distance from the magnets 6 and 11 becomes, the smaller an amount of electromagnetic force becomes, thereby making it difficult to control movement accurately. However, when the second magnet 11 is placed between the first magnet 6 and the third magnet 13 with an equal distance (at a center between the first magnet 6 and the third magnet 13), attenuation of an electromagnetic force accompanied by movement of the lens support members 5 and 10 can be suppressed to a minimum to control movement easily.

Moreover, in this embodiment, since there is provided the guiding section that guides linear movement of the lens support members 5 and 10, the lens support members can be stably moved. Particularly, in this embodiment, the guide section is shared in the two lens support members 5 and 10, and includes the pair of shafts 31 and 32 passing through the lens support members 5 and 10 in the axial direction. Accordingly, rattle in a peripheral direction of the lens support members 5 and 10 can be surely prevented with an extremely simple structure to make it possible to achieve linear movement of the lens support members 5 and 10 surely and satisfactorily.

Sixth Embodiment

FIGS. 19 to 28 illustrate a sixth embodiment of the present invention. Specifically, FIGS. 19 to 24 show a structure of driving section 1A of lens driving apparatus 1 according to the sixth embodiment and its modification, and FIGS. 25 to 28 show an entire structure including a lens and its modification.

The driving section 1A of the lens driving apparatus 1 according to the sixth embodiment is a coil movable type driving apparatus, and includes a pair of yokes 7 and 12 formed in cooperation with a box-shape containing space W and a magnet 6 placed in the containing space W, and a coil 9 placed in the containing space W. In this case, one first yoke 7 is plate-shaped and the other second yoke 12 is formed with a rectangular and U-shaped cross section.

The coil 9 functions as a driving member that is linearly moved by an electromagnetic force induced by a magnetic field formed by current flowing into the coil 9 and the magnet 6. Also, the coil 9 holds magnetic members (a pair of iron pieces in this embodiment) 33, which generate magnetic attraction between the coil 9 and the magnet 6, to be linearly moved by an electromagnetic force as always receiving the attraction.

The magnet 6 is fixed to first yoke 7, and includes a pair of magnet portions 6A and 6B arranged in series along a moving direction of the coil 9. Regarding respective magnet portions 6A and 6B, polarities of their surface and back are different from each other. Moreover, polarities of adjacent surfaces of the magnetic portions 6A and 6B are also different from each other.

Moreover, in this embodiment, there is provided a guiding section that guides linear movement of the coil 9. More specifically, the guiding section includes a pair of guide rails 12A and 12B fixed to both side edges of the first yoke 7 and a slide member 14, which holds the coil 9 and slidably engages with the guide rails 12A and 12B. In this case, respective guide rails 12A and 12B have a concave portion 16 along their entire length, and the slide member 14 has a convex portion 24 engaging with the concave portion 16 along an entire length of a projection column 18, which supports the coil 9 from both sides thereof. In addition, the magnet 6 is positioned to fit between the guide rails 12A and 12B without projecting.

According to the above structure, when current is passed through the coil 9 through a conductor electrically connected to the coil 9, the coil 9 is linearly moved along a direction where the magnet portions 6A and 6B are arranged by an electromagnetic force induced by a magnetic field formed by the current and the magnet 6. Also, the coil 9 always receives magnetic attraction from the magnet 6 through the magnetic members 33 at both a moving time and stopping time. Accordingly, when magnitude in the current flowing into the coil 9 or the magnetic force of the magnet 6 is adjusted in such a way to generate thrust (electromagnetic force) exceeding an engagement frictional force between the slide member 14 and the guide rails 12A and 12B caused by the attraction, the coil 9 can be magnetically moved as receiving the attraction.

As explained above, in the driving section 1A of the lens driving apparatus 1, the coil 9 is linearly moved by the electromagnetic force induced by the electromagnetic force as always receiving the magnetic attraction acting between the magnet 6 and the magnetic members 33. In this way, when the attraction always acts on a driving member, the driving member can be prevented from being shifted by impact. Also, the driving member can be stabilized, so that the driving member can be correctly moved by a desired amount. In other words, this provides excellent maintenance and mobility of the driving member. Even when shaking and damage occur, shaking and rattle are less likely to be generated in the driving member to provide excellent impact resistance.

Moreover, in the driving section 1A of the lens driving apparatus 1 according to this embodiment, the magnet 6 is fixed to the first yoke 7, and the coil 9 as the driving member is linearly moved as holding the magnetic members 33. In this way, when the coil 9 itself, which generates an electromagnetic force, forms the driving member that is driven on receiving the electromagnetic force, there is no need of providing the driving member individually, thereby making it possible to miniaturize the lens driving apparatus in its entirety.

Furthermore, in the driving section 1A of the lens driving apparatus 1 according to this embodiment, since there is provided the guiding section that guides linear movement of the coil 9, the coil 9 can be stably moved. Particularly, in this embodiment, since the guide section includes the guide rails 12A and 12B fixed to the first yoke 7 and the slide member 14, which is slidably engaged with the guide rails 12A and 12B, the coil can be stably and smoothly moved.

Moreover, in the driving section 1A of the lens driving apparatus 1 according to this embodiment, the magnet 6 includes the multiple magnet portions 6A and 6B. The polarities of adjacent surfaces of the magnetic portions 6A and 6B are also different from each other in an arranging direction. For this reason, an electromagnetic force (thrust) in the same direction can be formed over an entire length of a path where the driving member is moved to achieve satisfactory linear movement.

Figure 22A:
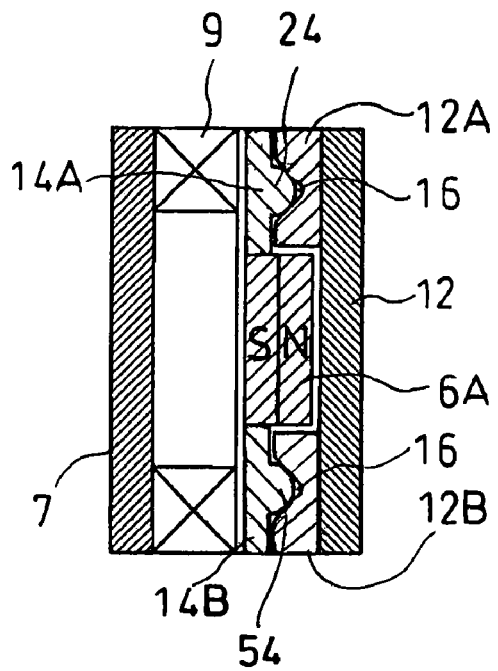
FIG. 22A is a transverse sectional view of a lens driving apparatus according to a modification of the sixth embodiment of the present invention.
Figure 22B:
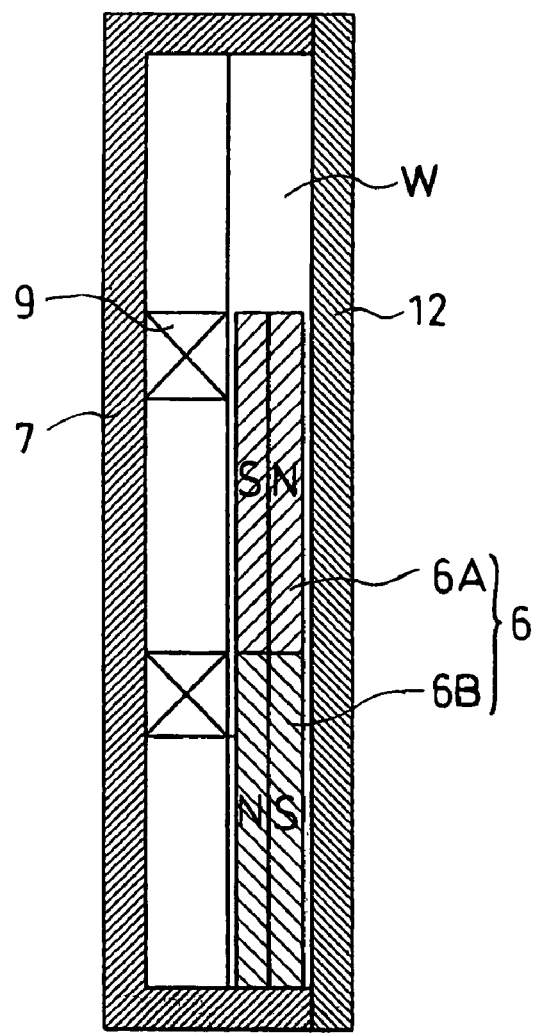
FIG. 22B is a longitudinal sectional view of the lens driving apparatus according to the second embodiment of the present invention.
Figure 23:
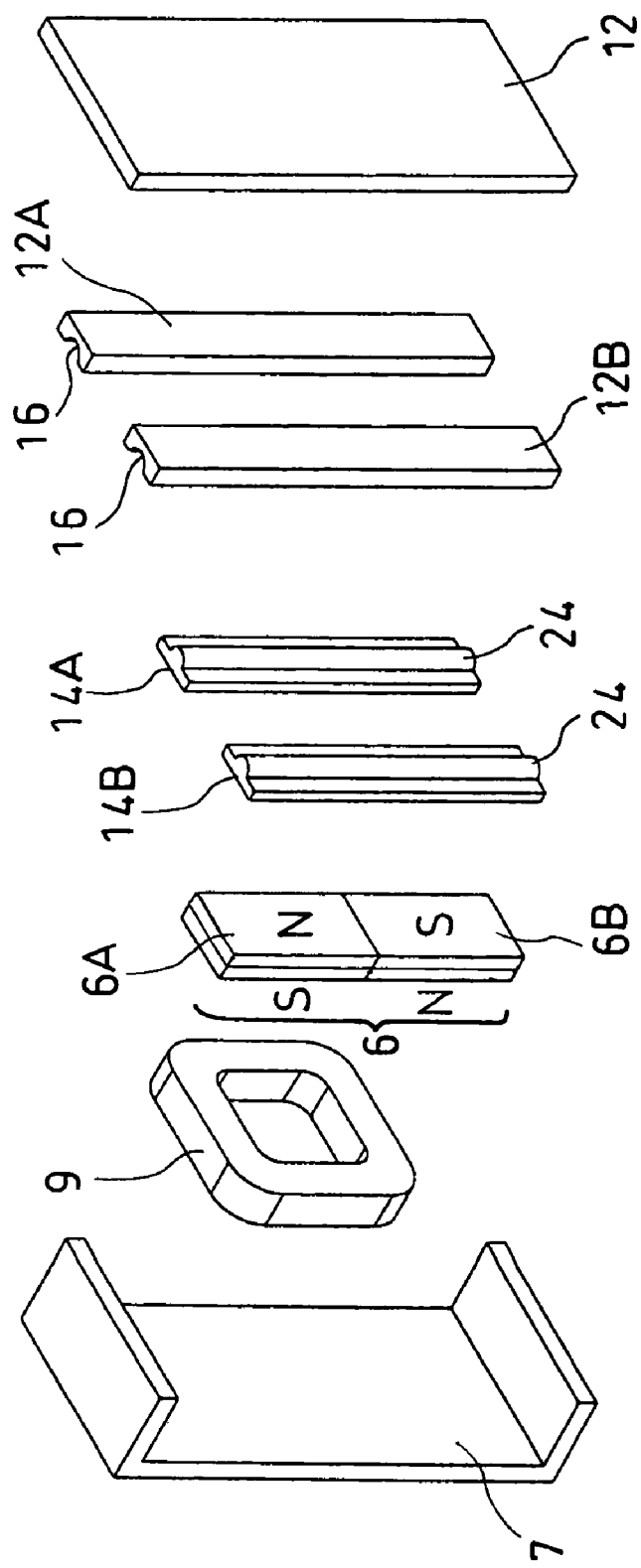
FIG. 23 is an exploded perspective view of the lens driving apparatus of FIG. 22A.
Figure 24:
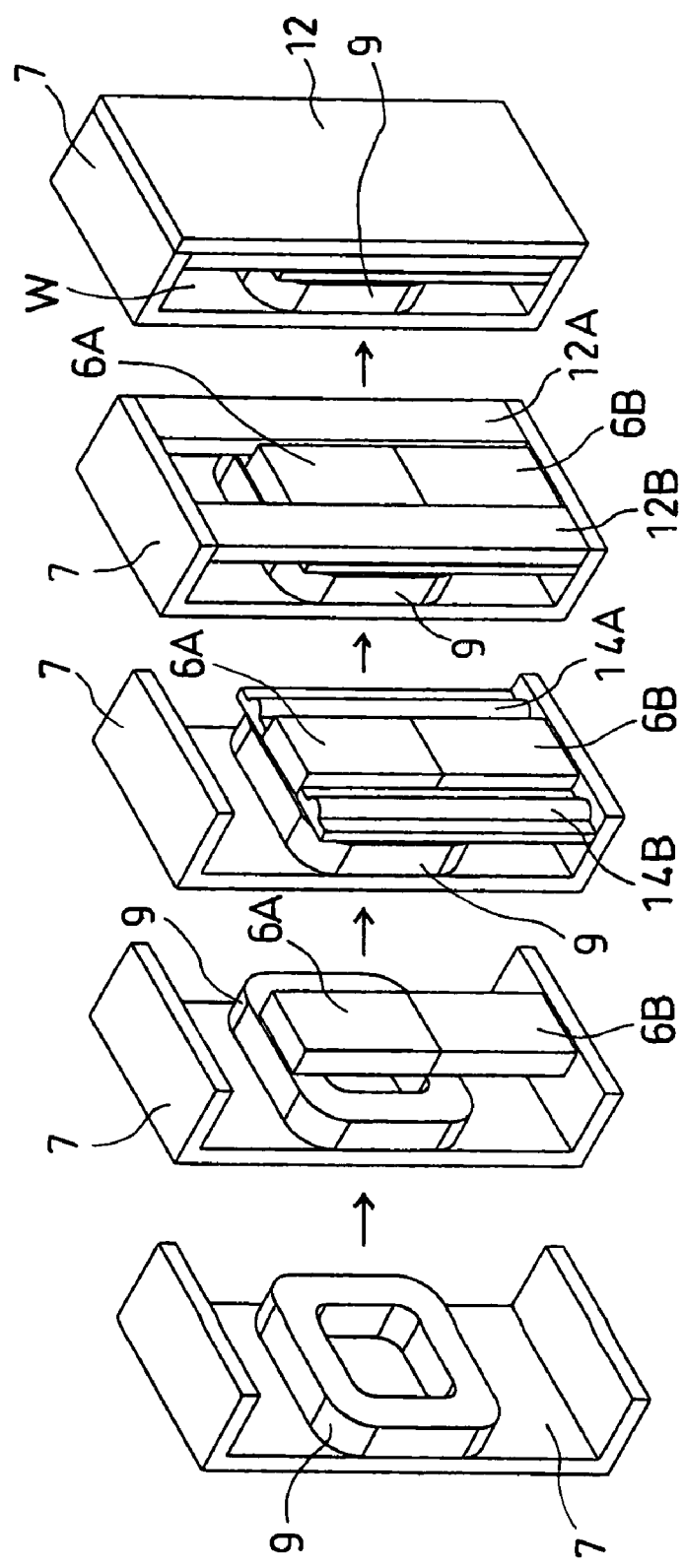
FIG. 24 is a perspective view illustrating one example of assembly steps of the lens driving apparatus of FIG. 22A.

FIGS. 22 to 24 illustrate a modification of the driving section 1A of the lens driving apparatus 1 according to the sixth embodiment. The driving section 1A according to this modification is a magnet movable type driving apparatus, and includes a pair of yokes 7 and 12 formed in cooperation with box-shape containing space W and magnet 6 placed in the containing space W, and coil 9 placed in the containing space W. In this case, one first yoke 7 is formed with a rectangular and U-shaped cross section and the other yoke 12 is plate-shaped. Also, the second yoke 12 is formed as a magnetic member that generates magnetic attraction between the second yoke 12 and the magnet 6. Moreover, the coil 9 is fixed to the first yoke 7.

The magnet 6 functions as a driving member that is linearly moved by an electromagnetic force induced by a magnetic field formed by current flowing into the coil 9 and the magnet 6. In this case, the magnet 6 is linearly moved by the electromagnetic force as always receiving attraction generated between the magnet 6 and the second yoke 12 as the magnetic member. Moreover, the magnet 6 includes a pair of magnet portions 6A and 6B arranged and adhered to each other in a direction along a moving direction. Regarding respective magnet portions 6A and 6B, polarities of their surface and back are different from each other. Moreover, polarities of adjacent surfaces of the magnetic portions 6A and 6B are also different from each other.

Furthermore, in this modification, there is provided a guiding section that guides linear movement of the magnet 6. More specifically, the guiding section includes a pair of guide rails 12A and 12B fixed to both side edges of the first yoke 7 and a pair of slide members 14A and 14B, which hold the magnet 6 and slidably engage with the guide rails 12A and 12B. In this case, respective guide rails 12A and 12B have a concave portion 16 along their entire length, and the slide members 14A and 14B have a convex portion 24 engaging with the concave portion 16 along an entire length thereof. Additionally, in this modification, a part of the magnet 6 is positioned to be contained between the guide rails 12A and 12B.

According to the above structure, when current is passed through the coil 9 through a conductor electrically connected to the coil 9, the magnet 6 is linearly moved along a direction where the magnet portions 6A and 6B are arranged by the electromagnetic force induced by the magnetic field formed by the current and the magnet 6. Also, the magnet 6 always receives magnetic attraction from the second yoke 12 as the magnetic member at both a moving time and stopping time. Accordingly, when magnitude in the current flowing into the coil 9 or the magnetic force of the magnet 6 is adjusted in such a way to generate thrust (electromagnetic force) exceeding an engagement frictional force between the slide members 14A and 14B and the guide rails 12A and 12B caused by attraction, the magnet 6 can be magnetically moved as receiving the attraction.

In the modification of the sixth embodiment, the coil 9 is fixed to the first yoke 7, at least part of the second yoke 12 forms the magnetic member, and the magnet 6 functions as a driving member that is linearly moved. In this way, when the magnet 6 itself, which generates an electromagnetic force, forms the driving member that is driven on receiving the electromagnetic force, there is no need of providing a magnetic member individually, thereby making it possible to further miniaturize the lens driving apparatus in its entirety.

Furthermore, since the guiding section includes the guide rails 12A and 12B fixed to the second yoke 12 and the slide members 14A and 14B, which are slidably engaged with the guide rails 12A and 12B, the magnet 6 can be stably and smoothly moved.

Figure 25:
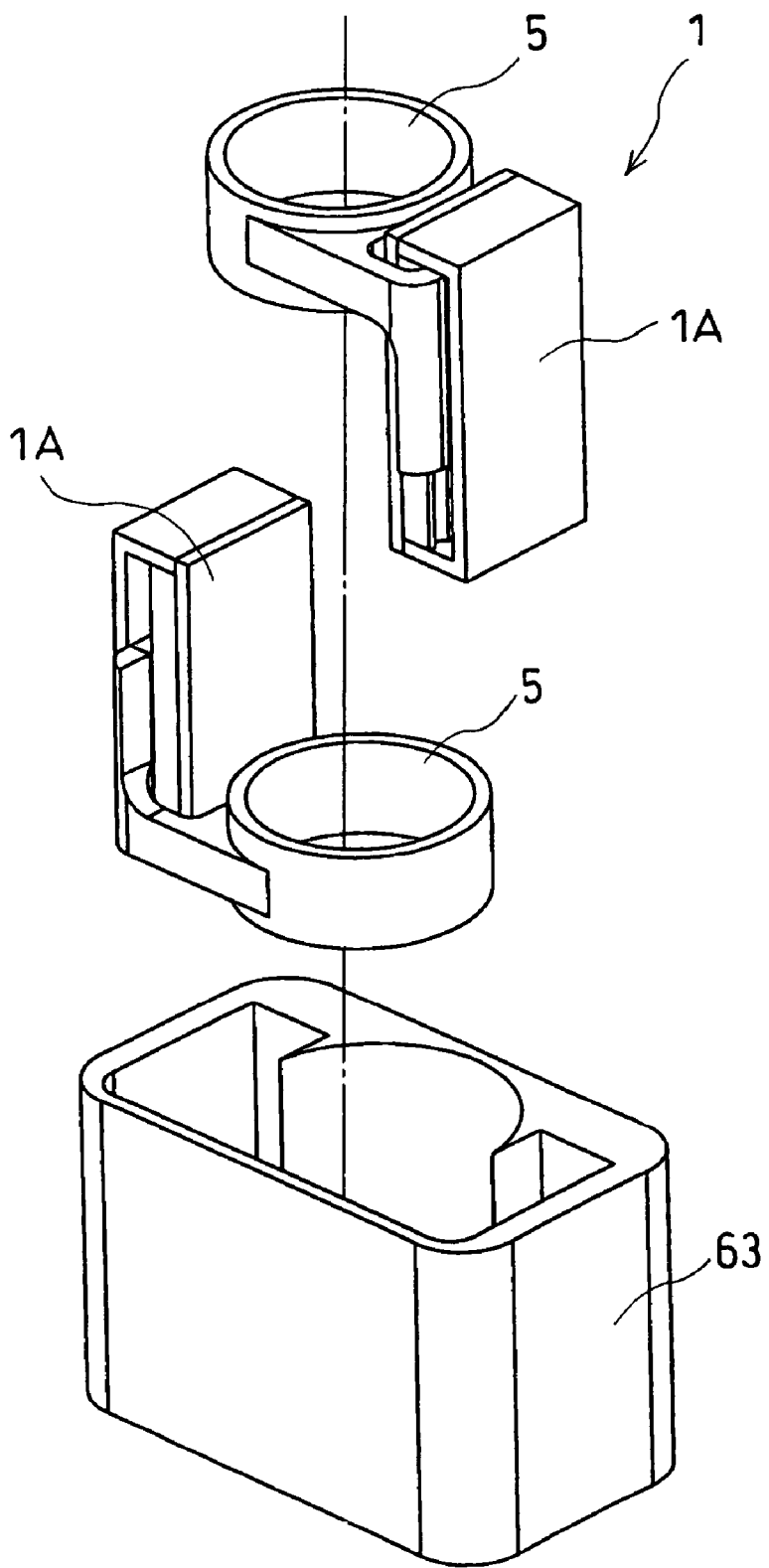
FIG. 25 is an exploded perspective view schematically illustrating a state in which a lens is moved along a direction of an optical axis by the lens driving apparatuses of FIGS. 1 to 6.
Figures 26A, 26B:
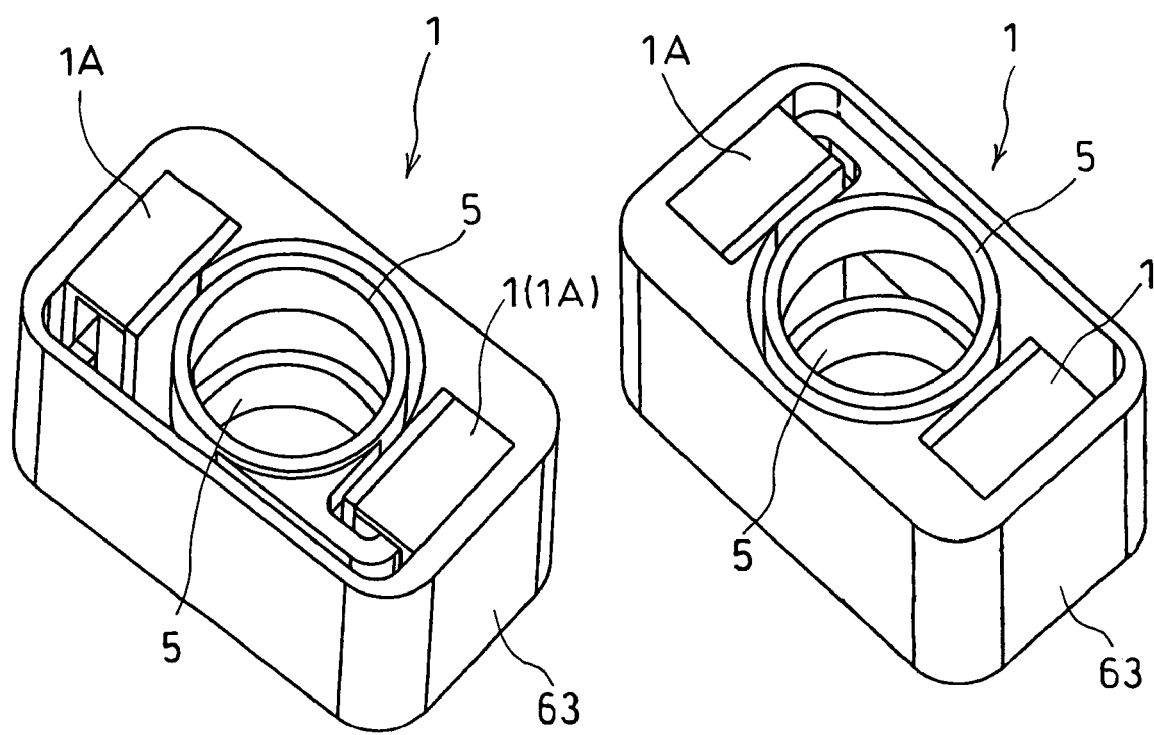
FIG. 26A is a view of an assembled body of the lens driving apparatus of FIG. 25 seen from the top.
FIG. 26B is a view of the assembled body of the lens driving apparatus of FIG. 25 seen from the bottom.

FIGS. 25 and 26 illustrate an appearance of the lens driving apparatus 1 according to the sixth embodiment. The lens driving apparatus 1 includes a housing 63 that holds a pair of driving sections 1A and 1A in a state that these driving sections are opposite to each other.

Moreover, each of linear driving apparatuses 1, 1 has lens support member 5, that supports a lens. The lens support members 5, 5 of linear driving apparatuses 1, 1 are positioned to be spaced from each other along a direction of an optical axis.

Figure 27:
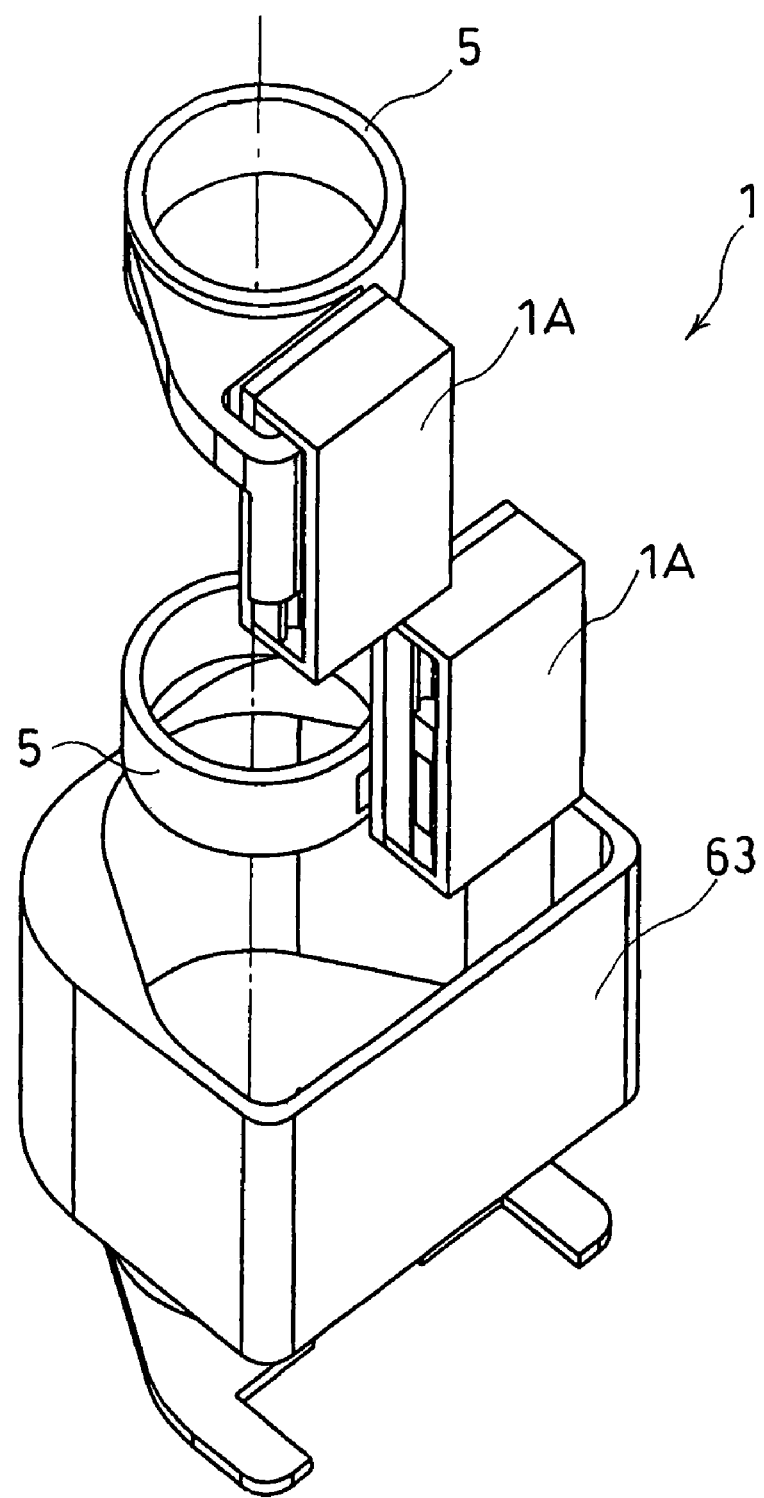
FIG. 27 is a modification of the lens driving apparatus of FIG. 25 and an exploded perspective view schematically illustrating a state in which a lens is moved along a direction of an optical axis.

FIGS. 27 and 28 illustrate an appearance of the lens driving apparatus 1 according to the modification of the sixth embodiment. This lens driving apparatus 1 has a pair of coil movable type driving sections 1A or a pair of magnet movable type liner driving sections 1A. The lens driving apparatus 1 includes a housing 63 that holds the pair of driving sections 1A and 1A in a state that these driving sections are connected in parallel. Lens support members 5, 5 of linear driving apparatuses 1A, 1A are positioned to be spaced from each other along a direction of an optical axis. This structure can obtain the same operation and working-effect as those of FIGS. 25 and 26.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

What is claimed is:

1. A lens driving apparatus comprising:
    a first yoke having an inner peripheral wall and an outer peripheral wall concentric with one another and forming a rectangular U-shaped cross section and a cylindrical shape at a connecting portion between said inner peripheral wall and said outer peripheral wall;
    a second yoke on an outer side of said first yoke and concentric with said first yoke, said second yoke defining a rectangular U-shaped cross section and a cylindrical shape;
    a base to which said first and second yokes are attached;
    a first magnet and a first coil in a rectangular U-shape interior of said first yoke, with said first coil facing an inner peripheral surface of said first magnet;
    a second magnet and a second coil in a rectangular U-shape interior of said second yoke, with said second coil facing an inner peripheral surface of said second magnet;
    a first lens support member at an inner peripheral side of said first yoke, with said first coil being fixed onto an outer peripheral portion of said first lens support member; and
    a second lens support member at an inner peripheral side of said second yoke, with said second coil fixed onto an outer peripheral portion of said second lens support member;
    wherein said first coil and said second coil are concentric with one another, and
    wherein said first magnet and said second magnet are linearly arranged in a direction of an optical axis of a lens when the lens is supported by one of said first and second lens support members,
    such that, while said first coil remains facing said inner peripheral surface of said first magnet, said first lens support member and said first coil are to be linearly moved together in the direction of the optical axis by an electromagnetic force generated by passing current through said first coil, and
    such that, while said second coil remains facing said inner peripheral surface of said second magnet, said second lens support member and said second coil are to be linearly moved together in the direction of the optical axis by an electromagnetic force generated by passing current through said second coil.

2. The lens driving apparatus according to claim 1, wherein said inner peripheral wall of said first yoke is to come into slidable contact with an inner surface of said first lens support member, such that said first lens support member is to be linearly moved in the direction of the optical axis by sliding along said inner peripheral wall of said first yoke such that friction is generated between a slidably contacting portion of said inner peripheral wall of said first yoke and said inner surface of said first lens support member, and
    an inner peripheral wall of said second yoke is to come into slidable contact with an inner surface of said second lens support member, such that said second lens support member is to be linearly moved in the direction of the optical axis by sliding along said inner peripheral wall of said second yoke such that friction is generated between a slidably contacting portion of said inner peripheral wall of said second yoke and said inner surface of said second lens support member.

3. The lens driving apparatus according to claim 1, further comprising:
    a first spring, between said first lens support member and said base, for urging said first lens support member toward said base when no current is passed through said first coil; and
    a second spring, between said second lens support member and said first yoke, for urging said second lens support member toward said base when no current is passed through said second coil.

4. A lens driving apparatus comprising:
    a yoke having an inner peripheral wall and an outer peripheral wall concentric with one another and forming a rectangular U-shaped cross section and a cylindrical shape at a connecting portion between said inner peripheral wall and said outer peripheral wall;
    a base to which said yoke is attached;
    a magnet between said inner peripheral wall and said outer peripheral wall;
    a first lens support member having a first coil on an outer peripheral portion thereof, at an inner peripheral side of said magnet, with said first coil facing a peripheral surface of said magnet; and
    a second lens support member having a second coil on an outer peripheral portion thereof, at an inner peripheral side of said first coil,
    wherein said first and second coils are concentric with one another, and
    wherein said magnet is linearly arranged in a direction of an optical axis of a lens when the lens is supported by one of said first and second lens support members,
    such that, while said first coil remains facing said inner peripheral surface of said magnet, said first lens support member and said first coil are to be linearly moved together in the direction of the optical axis by an electromagnetic force generated by passing current through said first coil, and
    such that said second lens support member and said second coil are to be linearly moved together in the direction of the optical axis by an electromagnetic force generated by passing current through said second coil.

5. The lens driving apparatus according to claim 4, wherein said first lens support member and said second lens support member are arranged parallel to one another in the direction of the optical axis, and said yoke is to come into slidable contact with said first lens support member and said second lens support member such that said first lens support member is to be linearly moved in the direction of the optical axis by sliding along said yoke such that friction is generated between said first lens support member and a slidably contacting portion of said yoke, and such that said second lens support member is to be linearly moved in the direction of the optical axis by sliding along said yoke such that friction is generated between said second lens support member and said yoke.

6. The lens driving apparatus according to claim 4, further comprising:
a first spring, between said first lens support member and said yoke, for urging said first lens support member toward said base when no current is passed through said first coil; and
a second spring, between said second lens support member and said base, for urging said second lens support member toward said base when no current is passed through said second coil.

7. A lens driving apparatus comprising:
a yoke having an inner peripheral wall and an outer peripheral wall concentric with one another and forming a rectangular U-shaped cross section and a cylindrical shape at a connecting portion between said inner peripheral wall and said outer peripheral wall;
a base to which said yoke is attached;
a magnet between said inner peripheral wall and said outer peripheral wall;
a first lens support member having a first coil on a portion thereof, at an inner peripheral side of said magnet, with said first coil facing a peripheral surface of said magnet; and
a second lens support member having a second coil on a portion thereof, at the inner peripheral side of said magnet, with said second coil facing the peripheral surface of said magnet,
wherein said first and second coils are concentric with one another and arranged parallel to one another in a direction of an optical axis of a lens when the lens is supported by one of said first and second lens support members,
wherein said magnet is linearly arranged in the direction of the optical axis, and
wherein a distance from said first coil to said magnet is substantially equal to a distance from said second coil to said magnet,
such that, while said first coil remains facing said peripheral surface of said first magnet, said first lens support member and said first coil are to be linearly moved together in the direction of the optical axis by an electromagnetic force generated by passing current through said first coil, and
such that, while said second coil remains facing said peripheral surface of said second magnet, said second lens support member and said second coil are to be linearly moved together in the direction of the optical axis by an electromagnetic force generated by passing current through said second coil.

8. The lens driving apparatus according to claim 7, wherein said inner peripheral wall of said yoke has slidably contacting portions with a predetermined distance along a peripheral direction of said inner peripheral wall, such that said slidably contacting portions are to come into slidable contact with inner surfaces of said first and second lens support members such that said first lens support member is to be linearly moved in the direction of the optical axis by sliding along said yoke such that friction is generated between said inner surface of said first lens support member and said slidably contacting portions, and such that said second lens support member is to be linearly moved in the direction of the optical axis by sliding along said yoke such that friction is generated between said inner surface of said second lens support member and said slidably contacting portions.

9. The lens driving apparatus according to claim 7, further comprising:
a first spring, between said first lens support member and said yoke, for urging said first lens support member toward said base when no current is passed through said first coil; and
a second spring, between said second lens support member and said base, for urging said second lens support member toward said base when no current is passed through said second coil.

10. A lens driving apparatus comprising:
a cylindrical yoke;
a first cylindrical lens support member and a second cylindrical lens support member contained in said yoke and concentric with each other, said first and second cylindrical lens support members being movable along an axial direction of said cylindrical yoke;
a magnet fixed to said yoke;
a first coil member fixed to said first cylindrical lens support member and facing an inner peripheral surface of said magnet;
a second coil member fixed to said second cylindrical lens support member and facing said inner peripheral surface of said magnet;
a first magnetic member for generating magnetic attraction between said magnet and said first magnetic member; and
a second magnetic member for generating magnetic attraction between said magnet and said second magnetic member,
wherein said magnet is linearly arranged in a direction of an optical axis of a lens when the lens is supported by one of said first and second cylindrical lens support members,
such that, while said first coil remains facing said inner peripheral surface of said first magnet, said first lens support member and said first coil are to be linearly moved together in the direction of the optical axis by an electromagnetic force generated by passing current through said first coil, with this linear movement to be suppressed by said first lens support member receiving a magnetic urging force acting between said magnet and said first magnetic member, and
such that, while said second coil remains facing said inner peripheral surface of said second magnet, said second lens support member and said second coil are to be linearly moved together in the direction of the optical axis by an electromagnetic force generated by passing current through said second coil, with this linear movement to be suppressed by said second lens support member receiving a magnetic urging force acting between said magnet and said second magnetic member.

11. The lens driving apparatus according to claim 10, wherein
said magnet comprises two adjacent magnet portions arranged along the direction of the optical axis, with polarities of said two adjacent magnet portions being different from one another.

12. The lens driving apparatus according to claim 10, further comprising:

guide shafts for guiding the linear movement of said first and second cylindrical lens support members, each of said guide shafts having a circular cross section, wherein said first cylindrical lens support member has wedge-shaped abutting surfaces to be abutted against said guide shafts, respectively, when said magnet and said first coil member receive the magnetic urging force acting between said magnet and said first magnetic member, so as to provide a frictional force when said first cylindrical lens support member is linearly moved, and wherein said second cylindrical lens support member has wedge-shaped abutting surfaces to be abutted against said guide shafts, respectively, when said magnet and said second coil member receive the magnetic urging force acting between said magnet and said second magnetic member, so as to provide a frictional force when said second cylindrical lens support member is linearly moved.

13. A lens driving apparatus comprising:

a cylindrical yoke;

a first annular magnet, a second annular magnet and a third annular magnet concentrically arranged in said yoke and spaced from one another along an axial direction of said yoke;

a first lens support member having a first coil on an outer peripheral portion of said first lens support member, said first coil being movably positioned between said first annular magnet and said second annular magnet; and a second lens support member having a second coil provided on an outer peripheral portion of said second lens support member, said second coil being movably positioned between said second annular magnet and said third annular magnet, wherein said first lens support member is to be linearly moved by an electromagnetic force induced by current flowing into said first coil and a magnetic field formed by said first annular magnet and said second annular magnet, and wherein said second lens support member is to be linearly moved by an electromagnetic force induced by current flowing into said second coil and a magnetic field formed by said second annular magnet and said third annular magnet.

14. The lens driving apparatus according to claim 13, wherein said first, second and third annular magnets are spaced from one another along the axial direction by an equal distance.

15. The lens driving apparatus according to claim 13, further comprising:

a guide member for guiding the linear movement of said first and second lens support members, with said guide member being shared in said first and second lens support members and including at least one shaft that passes through said first and second lens support members in the axial direction.

\* \* \* \* \*